(12) United States Patent
Kim et al.

(10) Patent No.: US 12,080,155 B2
(45) Date of Patent: *Sep. 3, 2024

(54) HAPTIC PROVIDING DEVICE AND METHOD FOR CONVERTING SOUND SIGNAL TO HAPTIC SIGNAL

(71) Applicant: CK MATERIALS LAB CO., LTD., Seoul (KR)

(72) Inventors: Hyeong Jun Kim, Seoul (KR); Jong Hun Lee, Seoul (KR); In Sik Jee, Seoul (KR)

(73) Assignee: CK MATERIALS LAB CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/330,388

(22) Filed: Jun. 7, 2023

(65) Prior Publication Data
US 2023/0316881 A1 Oct. 5, 2023

Related U.S. Application Data

(63) Continuation of application No. 17/057,291, filed as application No. PCT/KR2019/011558 on Sep. 6, 2019, now Pat. No. 11,710,389.

(30) Foreign Application Priority Data

Feb. 22, 2019 (KR) .................. 10-2019-0021216
Feb. 22, 2019 (KR) .................. 10-2019-0021217

(51) Int. Cl.
*G06F 3/16* (2006.01)
*G06F 3/01* (2006.01)
(Continued)

(52) U.S. Cl.
CPC ............... *G08B 6/00* (2013.01); *G06F 3/016* (2013.01); *G06F 3/165* (2013.01); *G10L 21/06* (2013.01);
(Continued)

(58) Field of Classification Search
CPC .......... G08B 6/00; G06F 3/016; G06F 3/165; G10L 21/06; H04R 3/00; H04R 2420/07; H04R 2430/01; H04S 7/30
See application file for complete search history.

(56) References Cited

U.S. PATENT DOCUMENTS

| 8,000,825 B2 | 8/2011 | Ullrich et al. |
| 9,285,905 B1 | 3/2016 | Buuck et al. |

(Continued)

FOREIGN PATENT DOCUMENTS

| CN | 101751733 A | 6/2010 |
| CN | 106414264 A | 2/2017 |

(Continued)

OTHER PUBLICATIONS

European search report for the European patent application No. EP 19915985.6, Oct. 8, 2021, European Patent Office, Munich, Germany.

(Continued)

*Primary Examiner* — Joseph Saunders, Jr.
(74) *Attorney, Agent, or Firm* — NKL Law; Jae Youn Kim

(57) ABSTRACT

Provided is a haptic device including a medium for receiving a digital sound signal from a portable terminal, a digital-to-analog converter (DAC) for receiving the digital sound signal from the medium and converting the digital sound signal into an analog signal, a sound outputter for receiving the analog signal and outputting sound, and a haptic actuator driven by receiving the analog signal.

19 Claims, 18 Drawing Sheets

(51) Int. Cl.
  *G08B 6/00*  (2006.01)
  *G10L 21/06* (2013.01)
  *H04R 3/00*  (2006.01)
  *H04S 7/00*  (2006.01)

(52) U.S. Cl.
  CPC ............... *H04R 3/00* (2013.01); *H04S 7/30* (2013.01); *H04R 2420/07* (2013.01); *H04R 2430/01* (2013.01)

(56) References Cited

U.S. PATENT DOCUMENTS

| | | |
|---|---|---|
| 9,444,506 B2 | 9/2016 | Lai et al. |
| 10,039,976 B2 | 8/2018 | Kim |
| 10,589,169 B2 | 3/2020 | Komori et al. |
| 10,926,293 B2 | 2/2021 | Park |
| 10,996,757 B2 | 5/2021 | Raghoebardajal et al. |
| 11,009,956 B2 | 5/2021 | Ogita et al. |
| 2008/0100568 A1 | 5/2008 | Koch et al. |
| 2013/0318438 A1 | 11/2013 | Afshar |
| 2014/0368440 A1 | 12/2014 | Polyakov et al. |
| 2015/0193195 A1 | 7/2015 | Lin et al. |
| 2016/0004311 A1 | 1/2016 | Yliaho |
| 2017/0136354 A1 | 5/2017 | Yamano et al. |
| 2017/0187855 A1 | 6/2017 | Hoellwarth |
| 2018/0028909 A1 | 2/2018 | Kim |
| 2020/0230649 A1 | 7/2020 | Park |

FOREIGN PATENT DOCUMENTS

| | | |
|---|---|---|
| GB | 2560004 A | 8/2018 |
| JP | 2018064264 A | 4/2018 |
| JP | 2018-529176 A | 10/2018 |
| KR | 20-0431968 Y1 | 11/2006 |
| KR | 20090130833 A | 12/2009 |
| KR | 10-0970574 B1 | 7/2010 |
| KR | 10-2012-0058961 A | 6/2012 |
| KR | 20130105101 A | 9/2013 |
| KR | 10-2015-0059165 A | 5/2015 |
| KR | 10-1606791 B1 | 3/2016 |
| KR | 10-2016-0144471 A | 12/2016 |
| WO | 2016136934 A1 | 9/2016 |

OTHER PUBLICATIONS

Search Report for the corresponding European Patent Application No. 19915985.6, Jun. 11, 2021, European Patent Office, Munich, Germany.

Gi-Hun Yang et al., "Development of Vibrotactile Pedestal With Multiple Actuators and Application of Haptic Illusions for Information Delivery", IEEE Transactions on Industrial Informatics, vol. 15, No. 1, Jan. 2019, pp. 591-598.

Office Action of CNIPA for Chinese application No. 201980033588.1, issued on Jan. 2, 2024.

Office Action of KIPO for Korean application No. 20190021216, issued on Nov. 30, 2023.

Office Action of KIPO for Korean application No. 20190021217, issued on Nov. 30, 2023.

HAPTIC PROVIDING DEVICE AND METHOD FOR CONVERTING SOUND SIGNAL TO HAPTIC SIGNAL

CROSS-REFERENCE TO RELATED APPLICATIONS

This application is a continuation of U.S. patent application Ser. No. 17/057,291, filed on Nov. 20, 2020, which claims the priority of the National Stage of international patent application PCT/KR2019/011558, filed on Sep. 6, 2019, which claims priority of foreign Korean patent application No. KR 10-2019-0021216, filed on Feb. 22, 2019 and foreign Korean patent application No. KR 10-2019-0021217, filed on Feb. 22, 2019, the disclosures of which are incorporated by reference in their entirety.

TECHNICAL FIELD

The present invention relates to a haptic device and method for converting a sound signal into a haptic signal.

BACKGROUND ART

Portable terminals provide an image signal and a sound signal to a user.

Many of the portable terminals include an eccentric motor. The portable terminal may vibrate due to operation of the eccentric motor included therein, and the user may receive a haptic signal through the vibration.

The haptic signal is controlled based on a digital signal generated by a controller of the portable terminal in response to a certain event.

Currently, technologies related to virtual reality and augmented reality are developed, and visual and auditory parts thereof are highly advanced to quite realistic levels. However, a haptic part is primitive compared to various types of tactile information that humans may feel, and thus may not implement realistic and rich sensations of touch.

The above-described background art is known or learned by the current inventors while inventing the present invention, and may or may not be known to the public before the present application is filed.

DETAILED DESCRIPTION OF THE INVENTION

Technical Solution

According to an embodiment of the present invention, a haptic device includes a medium for receiving a digital sound signal from a portable terminal, a digital-to-analog converter (DAC) for receiving the digital sound signal from the medium and converting the digital sound signal into an analog signal, a sound outputter for receiving the analog signal and outputting sound, and a haptic actuator driven by receiving the analog signal.

The medium may be a cable connectable to the portable terminal in a wired manner, the cable may receive not only the digital sound signal but also power output from a battery of the portable terminal, and the haptic actuator may be driven using the power received through the cable.

The haptic device may not include a battery.

The haptic device may further include a sound signal filter for receiving the analog signal from the DAC, filtering the analog signal to a first set frequency range, and transmitting the filtered signal to the sound outputter, and a haptic signal filter for receiving the analog signal from the DAC, filtering the analog signal to a second set frequency range having a highest value lower than the highest value of the first set frequency range, and transmitting the filtered signal to the haptic actuator.

The sound signal filter may be a band-pass filter (BPF) for passing only a frequency ranging from 20 Hz to 20 kHz, and the haptic signal filter may be a low-pass filter (LPF) for passing only a frequency lower than 800 Hz.

The haptic device may further include a sound signal amplifier for receiving the analog signal from the DAC, amplifying the analog signal by a first gain, and transmitting the amplified signal to the sound outputter, a sound volume controller capable of adjusting the first gain, a haptic signal amplifier for receiving the analog signal from the DAC, amplifying the analog signal by a second gain, and transmitting the amplified signal to the haptic actuator, and a haptic intensity controller capable of adjusting the second gain.

Any one of the sound volume controller and the haptic intensity controller may be capable of independently adjusting any one of the first and second gains regardless of adjustment operation of the other adjuster.

The haptic actuator may include a left haptic actuator located on a left side of a virtual centerline passing through the haptic device, and a right haptic actuator located on a right side of the virtual centerline passing through the haptic device.

The analog signal converted by the DAC may be a stereo analog signal including a plurality of signals.

In the stereo analog signal, a first signal may be input to the left haptic actuator and a second signal different from the first signal may be input to the right haptic actuator.

The medium may be a wireless communication module for receiving the digital sound signal from the portable terminal in a wireless manner and transmitting the digital sound signal to the DAC.

According to another embodiment of the present invention, a method for providing haptic effects includes receiving a digital sound signal from a portable terminal in a wired or wireless manner, converting the received digital sound signal into an analog signal, outputting sound by providing the converted analog signal to a sound outputter, and driving a haptic actuator by providing the converted analog signal to the haptic actuator.

According to another embodiment of the present invention, a haptic device includes a medium for receiving a digital sound signal from a portable terminal in a wired or wireless manner, a digital-to-analog converter (DAC) for receiving the digital sound signal from the medium and converting the digital sound signal into an analog signal, a haptic actuator driven by receiving the analog signal, a main body for accommodating the haptic actuator, and a sub-body located on a side of the main body and connected to the haptic actuator to be movable relative to the main body.

The haptic device may further include an adhesive pad located on another side of the main body and including an adhesive surface attachable to the portable terminal.

The haptic actuator may include a housing having an internal space, and a vehicle movable relative to the housing, the housing may be fixed to the main body, and the vehicle may be fixed to the sub-body.

A surface of the housing may be fixed to an inner wall of a surface of the main body.

The haptic device may further include a cushion placed to surround at least a portion of the housing to attenuate friction sound generated by the housing.

The sub-body may include a fixed boss protruding toward the vehicle, and the vehicle may include a protrusion protruding toward the sub-body and fixed to the fixed boss.

The haptic device may further include a guide rod having an end fixed to the sub-body and another end passing through a through hole provided in the main body, and mounted to guide motion of the sub-body relative to the main body.

The other end of the guide rod may have a larger diameter than the through hole to prevent detachment of the sub-body from the main body by more than a certain distance.

The sub-body may include a transmitter including the fixed boss, and a plate where the fixed boss is mounted, and a flexible cover made of a more flexible material than the transmitter and located on an opposite side of the plate from the fixed boss.

The flexible cover may include a contact pad surrounding a front surface of the plate, and a wing connected to an edge of the contact pad to prevent direct contact between the transmitter and the main body.

The transmitter may further include a flange having a smaller thickness than the plate and extending outward from an edge of the plate, and the wing may have a shape bent inward to surround the flange.

The main body may include a stopper for preventing insertion of the sub-body into the main body by more than a certain distance.

The main body may include a case having an inner wall to which a surface of the housing is fixed, and a bumper made of a more flexible material than the case and surrounding at least a portion of the case.

The bumper may include an opening having a smaller area than the sub-body, and a stopper having a step shape recessed inward along an edge of the opening, and capable of accommodating at least a portion of the sub-body and preventing direct contact between the sub-body and the case.

The haptic actuator may include a left haptic actuator located on a left side of a virtual centerline passing through the haptic device, and a right haptic actuator located on a right side of the virtual centerline passing through the haptic device.

The analog signal converted by the DAC may be a stereo analog signal including a plurality of signals, and, in the stereo analog signal, a first signal may be input to the left haptic actuator and a second signal different from the first signal may be input to the right haptic actuator.

The sub-body may include a left transmitter connected to the left haptic actuator, and a right transmitter connected to the right haptic actuator and spaced apart from the left transmitter to move independently of the left transmitter.

The haptic device may further include a printed circuit board (PCB) placed in the main body and having the medium and the DAC mounted thereon, and the haptic actuator is inserted into a hole provided in the PCB.

The haptic device may further include a seal made of a flexible material to prevent insertion of foreign substances into a space between the main body and the sub-body.

BEST MODE

Figure 1:
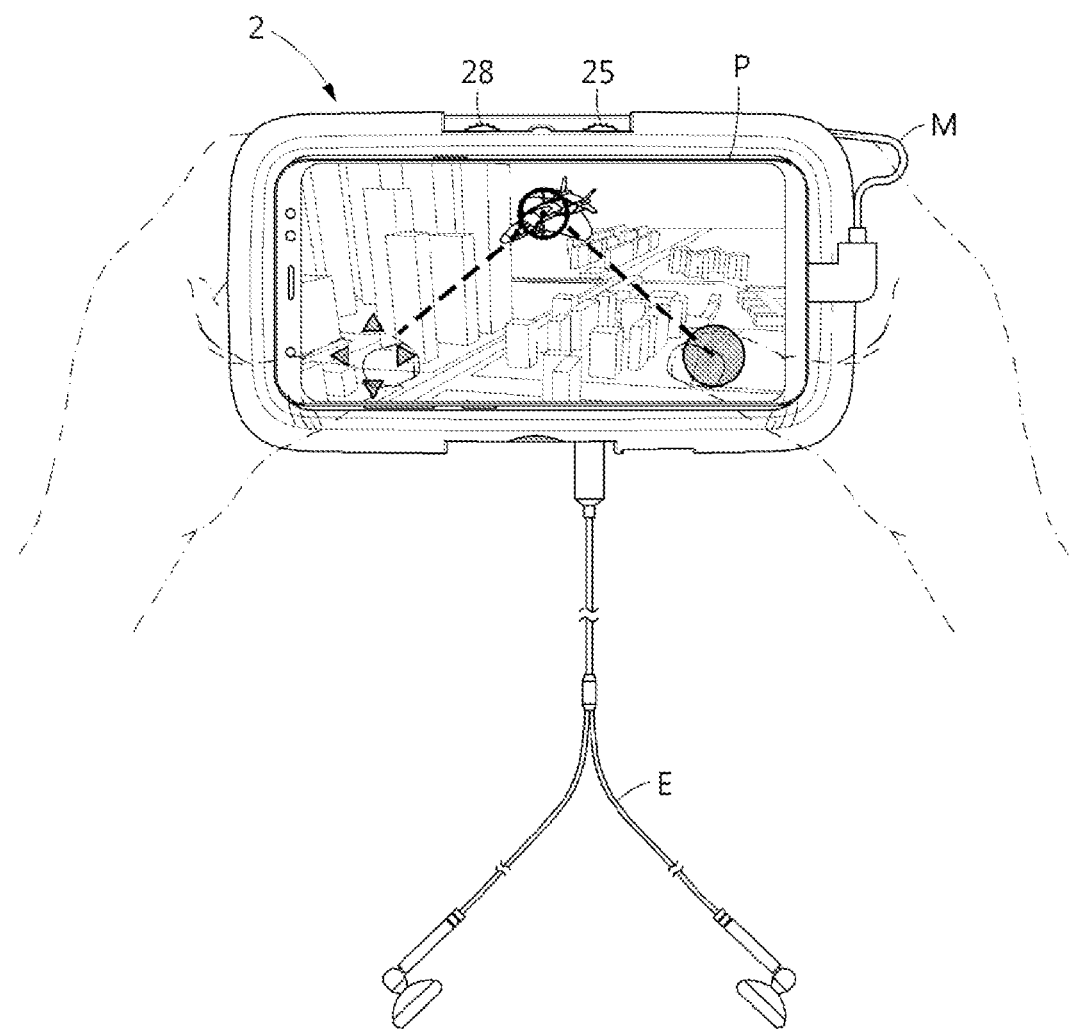
FIGS. 1 and 2 are front and rear views showing a used state of a haptic device according to an embodiment.

Hereinafter, the present invention will be described in detail by explaining embodiments of the invention with reference to the attached drawings. Like reference numerals in the drawings denote like elements. In the following description of the present invention, a detailed description of known functions and configurations incorporated herein will be omitted when it may make the subject matter of the present invention unclear.

Expressions such as "first", "second", "A", "B", "(a)", and "(b)" may be used to describe elements of embodiments. These expressions are merely used to distinguish one element from another without limiting the nature or order of the elements. It will be understood that when an element is referred to as being "connected" or "coupled" to another element, it may be directly connected or coupled to the other element or intervening elements may be present.

Elements having a common function will be called by the same name in different embodiments. Unless the context clearly indicates otherwise, descriptions related to any one embodiment are equally applicable to the other embodiments, and repeated descriptions will be omitted to avoid redundancy.

Figure 2:
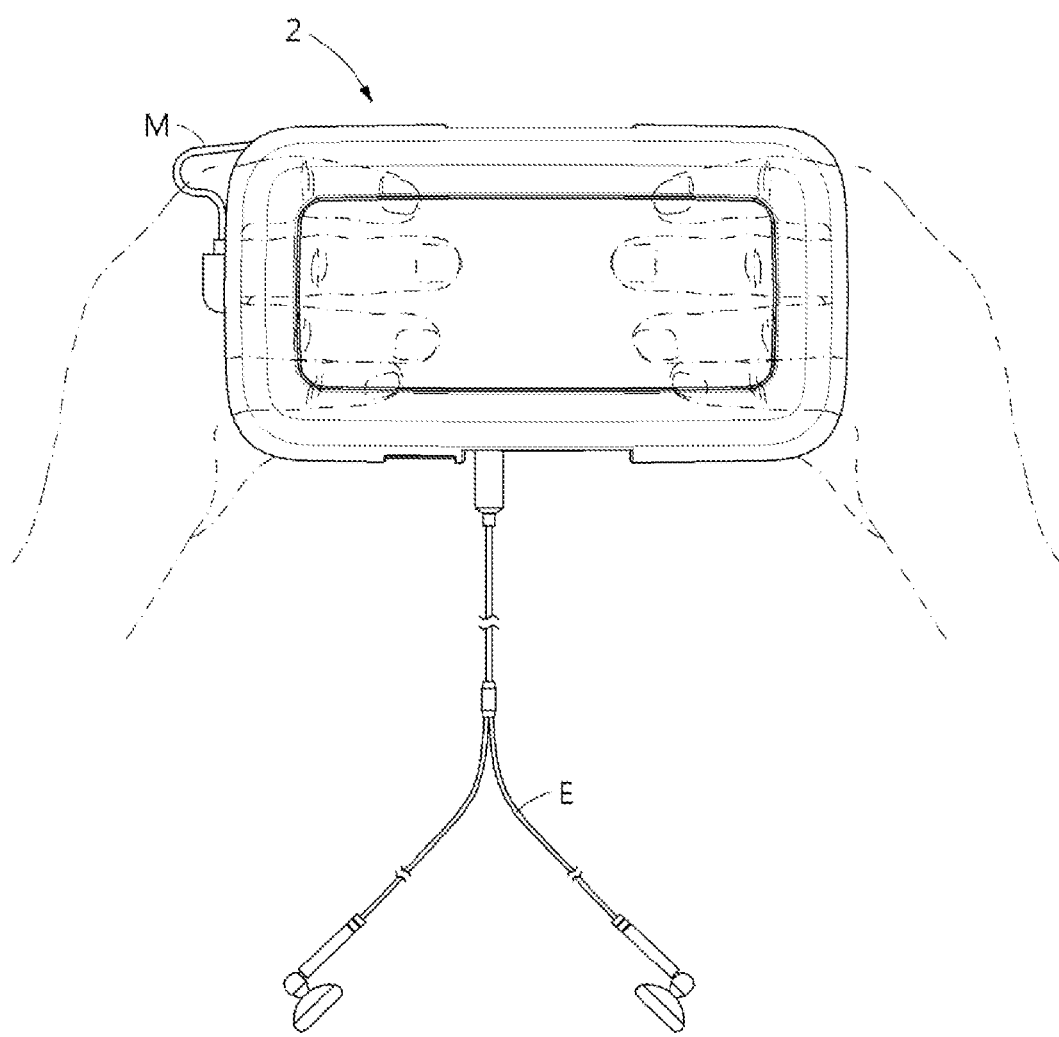
Figure 3:
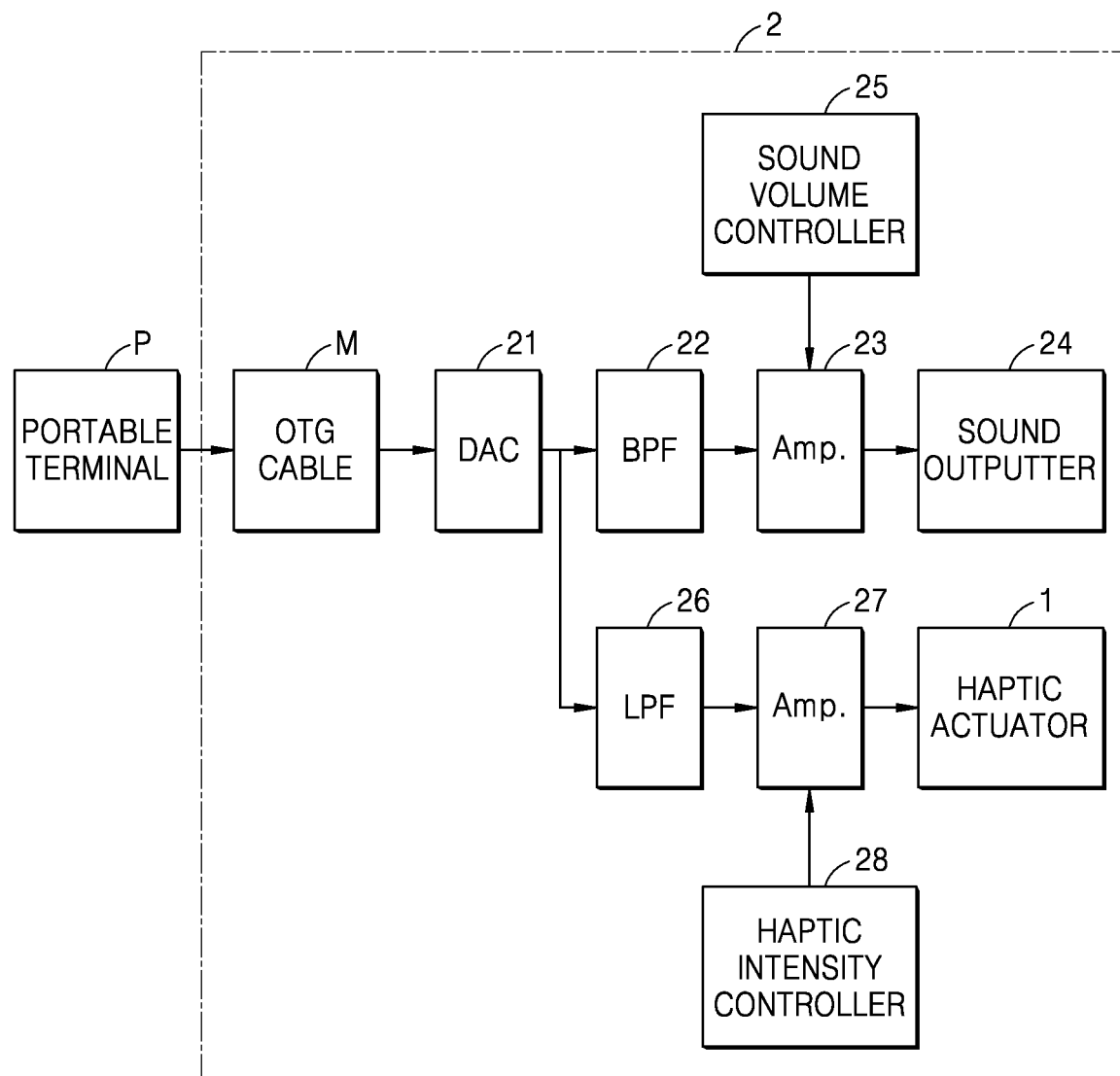
FIGS. 3 to 5 are block diagrams of haptic devices according to embodiments.

FIGS. 1 and 2 are front and rear views showing a used state of a haptic device 2 according to an embodiment, and FIG. 3 is a block diagram of the haptic device 2 according to an embodiment.

Referring to FIGS. 1 to 3, the haptic device 2 may receive a sound signal from a portable terminal P and provide haptic feedback corresponding to the sound signal to a user in real time. The user may haptically receive, via the haptic device 2, information about contents provided by the portable terminal P, and the contents may include various types of information for providing sound signals, e.g., games, movies, music, and voice.

For example, the haptic device 2 may rapidly provide a haptic signal to the user without using a central processing unit (CPU) for analyzing the sound signal and extracting feature information therefrom. When the CPU is used to extract the feature information from the sound signal and generate the haptic signal based on the extracted feature information, a time delay occurs and synchronization between timings for providing the sound signal and the haptic signal to the user is additionally required. However, according to an embodiment, the haptic feedback may be rapidly and efficiently provided to the user by using a simple structure without the time delay. Meanwhile, unless the context clearly indicates otherwise, it should be noted that a haptic device including a CPU is also included in the scope of the present invention.

For example, as illustrated in FIGS. 1 and 2, the user may use the haptic device 2 by placing the same on a side opposite to a display of the portable terminal P. In this manner, the user may receive the haptic feedback from the haptic device 2 with at least some of fingers other than thumbs while touching the display of the portable terminal P with the thumbs.

For example, the haptic device 2 may increase immersion in and fun of a game by providing, to the user, haptic feedback corresponding to background sound of the game or a game sound effect based on manipulation of the user. In addition, when listening to music, the haptic device 2 may increase musical sensibility by providing haptic feedback appropriate for the music to the user in real time.

The haptic device 2 may include a medium M for receiving a digital sound signal from the portable terminal P, a digital-to-analog converter (DAC) 21 for receiving the digital sound signal from the medium M and converting the digital sound signal into an analog signal, a sound outputter 24 for receiving the analog signal and outputting sound, and a haptic actuator 1 driven by receiving the analog signal.

The medium M may receive the digital sound signal from the portable terminal P in a wired or wireless manner.

For example, the medium M may be a cable M connectable to the portable terminal P in a wired manner. The cable M may receive not only the digital sound signal but also power output from a battery of the portable terminal P, and the haptic actuator 1 may be driven using the power received through the cable M. In addition to the haptic actuator 1, other active elements included in the haptic device 2 may also be driven by receiving the power output from the battery of the portable terminal P. According to the above-described structure, the haptic device 2 may be provided in a compact size because the haptic device 2 does not need to include a battery, and convenience of use may be increased because the user does not need to charge the haptic device 2. Meanwhile, it should be noted that the haptic device 2 including a battery is also included in the scope of the present invention.

For example, the cable M may use a universal serial bus on-the-go (USB OTG) cable. According to the general portable terminal standards, the priority of outputting the sound signal from the portable terminal P follows the order of ⓒ a USB OTG cable, (Ⓩ) a sound output terminal of the portable terminal P, and ⓡ an embedded speaker of the portable terminal P. Therefore, when the USB OTG cable is used as the medium M, the user may not hear sound from the sound output terminal of the portable terminal P. However, the haptic device 2 according to an embodiment may include the sound outputter 24 capable of providing, to the user, the sound signal received through the medium M, and thus the above-described problem may be solved. In other words, the haptic device 2 may be broadly used by connecting a single cable M to general portable terminals P without additional equipment or particular structural modification.

The sound outputter 24 may be, for example, a sound output terminal connectable to earphones E. Meanwhile, a speaker for generating sound to be provided to the user may be provided in the haptic device 2 and, unless the context clearly indicates otherwise, it should be understood that the speaker is also included in the sound outputter 24.

The haptic actuator 1 may use, for example, a broadband haptic actuator illustrated in FIGS. 13 to 17. Meanwhile, it should be noted that the type of the haptic actuator 1 is not limited thereto.

The haptic device 2 may include (i) a sound signal filter 22 for receiving the analog signal from the DAC 21, filtering the analog signal to a first set frequency range, and transmitting the filtered signal to the sound outputter 24, and (ii) a haptic signal filter 26 for receiving the analog signal from the DAC 21, filtering the analog signal to a second set frequency range, and transmitting the filtered signal to the haptic actuator 1.

For example, the highest value of the second set frequency range may be set to be lower than the highest value of the first set frequency range. For example, the lowest value of the second set frequency range may be set to be lower than the lowest value of the first set frequency range. For example, the second set frequency range and the first set frequency range may include a common frequency band. For example, the sound signal filter 22 may be a band-pass filter (BPF) for passing only a frequency ranging from 20 Hz to 20 kHz and, for example, the haptic signal filter 26 may be a low-pass filter (LPF) for passing only a frequency lower than 800 Hz. The meanings of the first and second set frequency ranges will be described below with reference to FIG. 7.

The haptic device 2 may include (i) a sound signal amplifier 23 for receiving the analog signal from the DAC 21, amplifying the analog signal by a first gain, and transmitting the amplified signal to the sound outputter 24, and (ii) a haptic signal amplifier 27 for receiving the analog signal from the DAC 21, amplifying the analog signal by a second gain, and transmitting the amplified signal to the haptic actuator 1. For example, the first gain and/or the second gain may be appropriately preset. As another example, the first gain and/or the second gain may be changed by the user as described below.

The haptic device 2 may include (i) a sound volume controller 25 capable of adjusting the first gain, and (ii) a haptic intensity controller 28 capable of adjusting the second gain. For example, any one of the sound volume controller 25 and the haptic intensity controller 28 may independently adjust any one of the first and second gains regardless of adjustment operation of the other adjuster. For example, when sound volume is controlled using a sound volume control function embedded in the portable terminal P, the volume of the digital sound signal transmitted from the portable terminal P through the medium M and the volume of the analog signal converted therefrom are reduced. In other words, using the sound volume control function embedded in the portable terminal P, sound volume and haptic volume may not be independently controlled. However, according to an embodiment, each of the sound volume controller 25 and the haptic intensity controller 28 may independently adjust the first or second gain. Therefore, the user may change a sound amplification level (e.g., the first gain) when necessary while maintaining a haptic amplification level (e.g., the second gain) set by and optimized for the user, and thus convenience of use may be increased. Likewise, the user may also change the haptic amplification level (e.g., the second gain) when necessary while maintaining the sound amplification level (e.g., the first gain).

Figure 4:
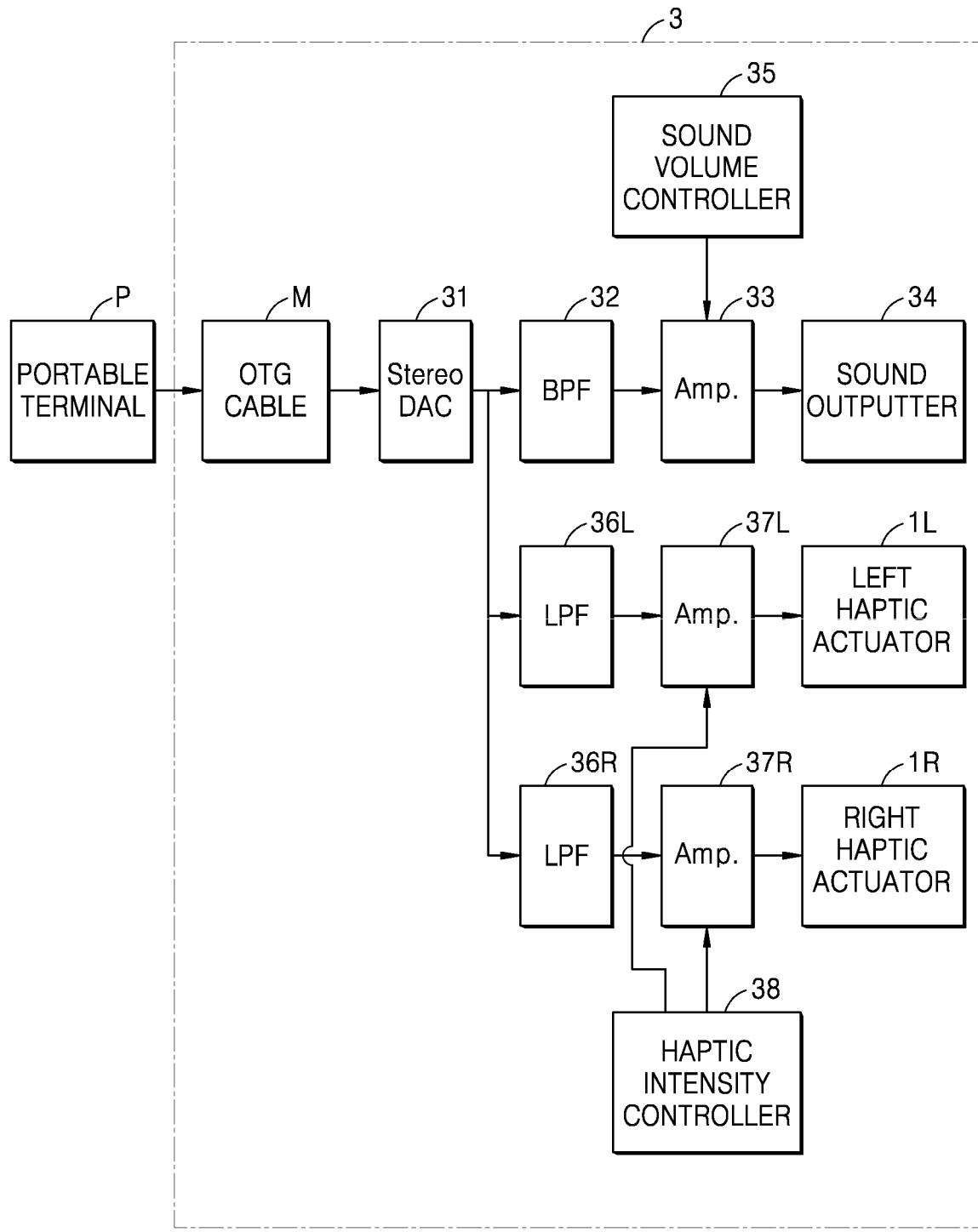

FIG. 4 is a block diagram of a haptic device 3 according to an embodiment.

Referring to FIG. 4, the haptic device 3 may include the medium M, a DAC 31, a sound signal filter 32, a sound signal amplifier 33, a sound outputter 34, a sound volume controller 35, haptic signal filters 36L and 36R, haptic signal amplifiers 37L and 37R, a haptic intensity controller 38, and haptic actuators 1L and 1R.

Figure 10:
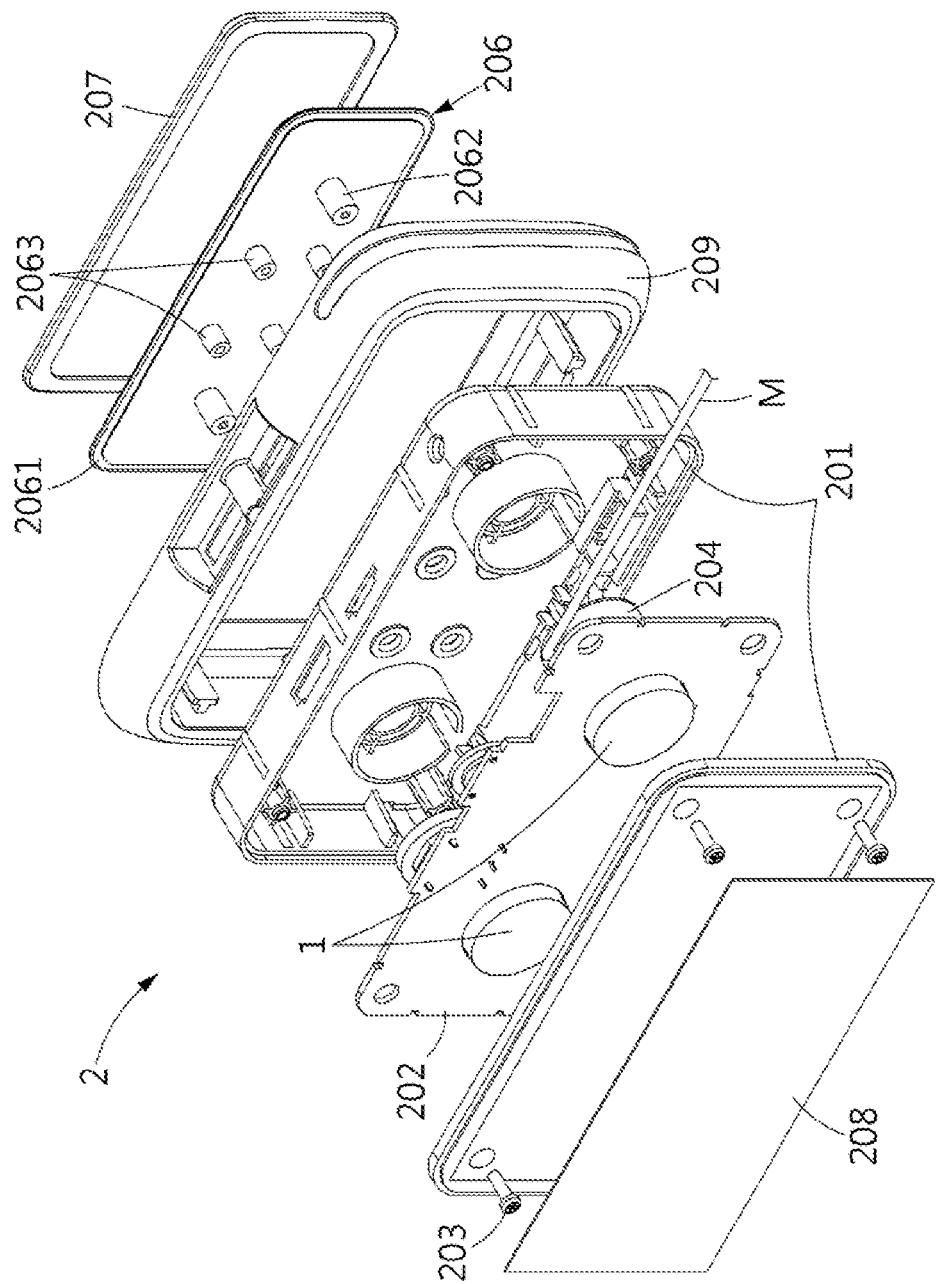
FIG. 10 is an exploded front perspective view of a haptic device according to an embodiment.

Similarly to the illustration of FIG. 10, the haptic actuators 1L and 1R may include (i) a left haptic actuator 1L located on a left side of a virtual centerline passing through the haptic device 3, and (ii) a right haptic actuator 1R located on a right side of the virtual centerline passing through the haptic device 3. According to the above-described structure, the haptic actuators 1L and 1R may be located close to fingers of a user and thus the efficiency of providing haptic feedback from the haptic actuators 1L and 1R to the user may be increased.

The DAC 31 may be, for example, a stereo DAC. In other words, an analog signal converted by the DAC 31 may be a stereo analog signal including a plurality of signals. In the stereo analog signal, a first signal may be input to the left haptic actuator 1L and a second signal different from the first signal may be input to the right haptic actuator 1R. By independently driving the left and right haptic actuators 1L and 1R, the haptic device 3 may provide haptic feedback to the user in a stereo manner. Therefore, the user may receive richer and more realistic haptic feedback corresponding to contents provided by the portable terminal P.

Figure 5:
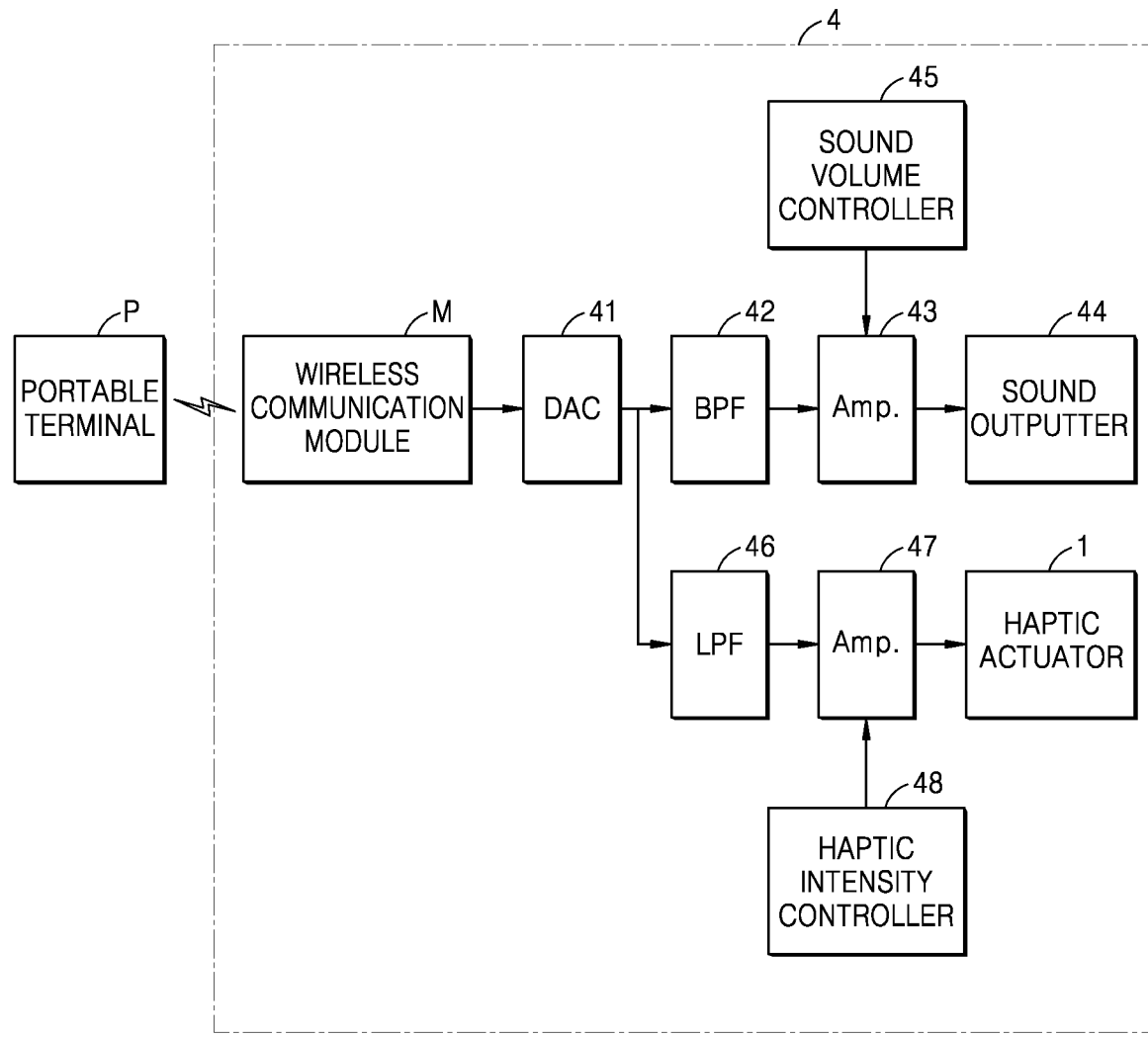

FIG. 5 is a block diagram of a haptic device 4 according to an embodiment.

Referring to FIG. 5, the haptic device 4 may include the medium M, a DAC 41, a sound signal filter 42, a sound signal amplifier 43, a sound outputter 44, a sound volume controller 45, a haptic signal filter 46, a haptic signal amplifier 47, a haptic intensity controller 48, and the haptic actuator 1.

The medium M may be a wireless communication module for receiving a digital sound signal from the portable terminal P in a wireless manner and transmitting the digital sound signal to the DAC 41. In this case, to supply power for driving the haptic actuator 1, the haptic device 4 may include (i) a battery, or (ii) a power input terminal for receiving power from an external power supply.

Figure 6:
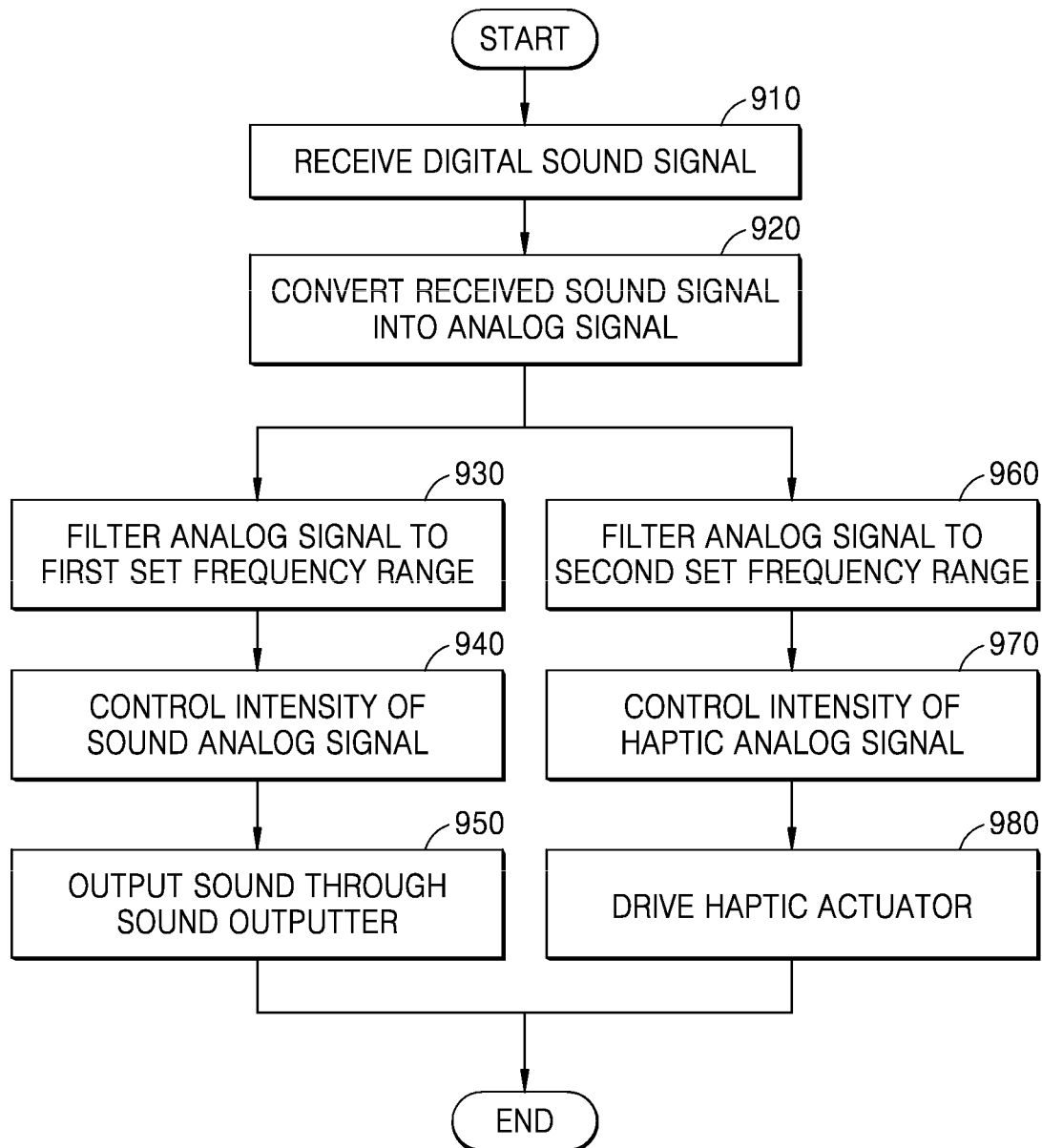
FIG. 6 is a flowchart of a method for providing haptic effects according to an embodiment.
Figure 7:
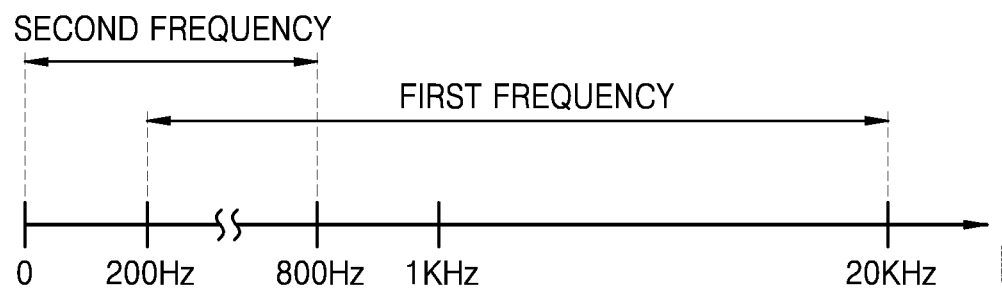
FIG. 7 is a graph showing frequency ranges for filtering an analog signal in a method for providing haptic effects according to an embodiment.

FIG. 6 is a flowchart of a method for providing haptic effects according to an embodiment, and FIG. 7 is a graph showing frequency ranges for filtering an analog signal in the method for providing haptic effects according to an embodiment.

Referring to FIGS. 6 and 7, the method for providing haptic effects may include receiving a digital sound signal from the portable terminal P in a wired or wireless manner (step 910), converting the received digital sound signal into an analog signal (step 920), outputting sound by providing the converted analog signal to the sound outputter 24, 34, or 44 (step 950), and driving the haptic actuator 1, 1L, or 1R by providing the converted analog signal to the haptic actuator 1, 1L, or 1R (step 980).

The method for providing haptic effects may further include filtering the converted analog signal to a first set frequency range (step 930) after step 920 and before step 950.

Step 930 may reduce energy wasted in the sound outputter 24, by removing frequencies other than a human audible frequency range of 20 Hz to 20 kHz, from the converted analog signal. The signal filtered in step 930 may be referred to as a "sound analog signal". The volume of the sound analog signal may be controlled before being output through the sound outputter 24 (step 940).

The method for providing haptic effects may further include filtering the converted analog signal to a second set frequency range (step 960) after step 920 and before step 980.

Herein, the highest value of the second set frequency range may be set to be sufficiently lower than a human tactile frequency range. The human tactile frequency range is generally known to be 0 to 1 kHz. However, it is experimentally proved that tingles remain in hands of a user and fatigue of the hands is increased when a high-frequency haptic signal ranging from 800 Hz to 1 kHz is repeated. Besides, it is also proved that a tactile threshold of the user in this case is increased and thus efficient haptic feedback may not be easily provided using the haptic device 2. Therefore, step 960 may reduce the above-described negative effect and continuously provide efficient haptic feedback to the user by removing a frequency higher than 800 Hz, from the converted analog signal. The signal filtered in step 960 may be referred to as a "haptic analog signal". The volume of the haptic analog signal may be controlled before being input to the haptic actuator 1 (step 970).

Figure 8:
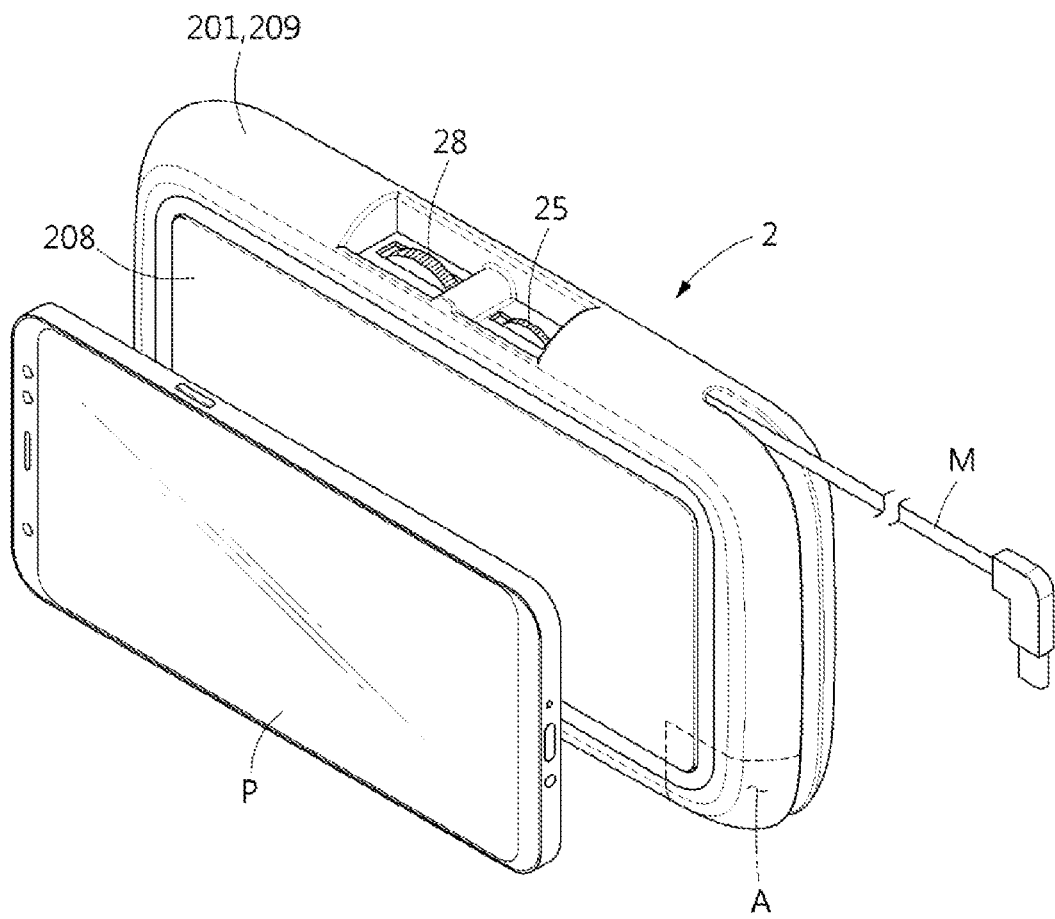
FIG. 8 is a front perspective view of a haptic device according to an embodiment.
Figure 9:
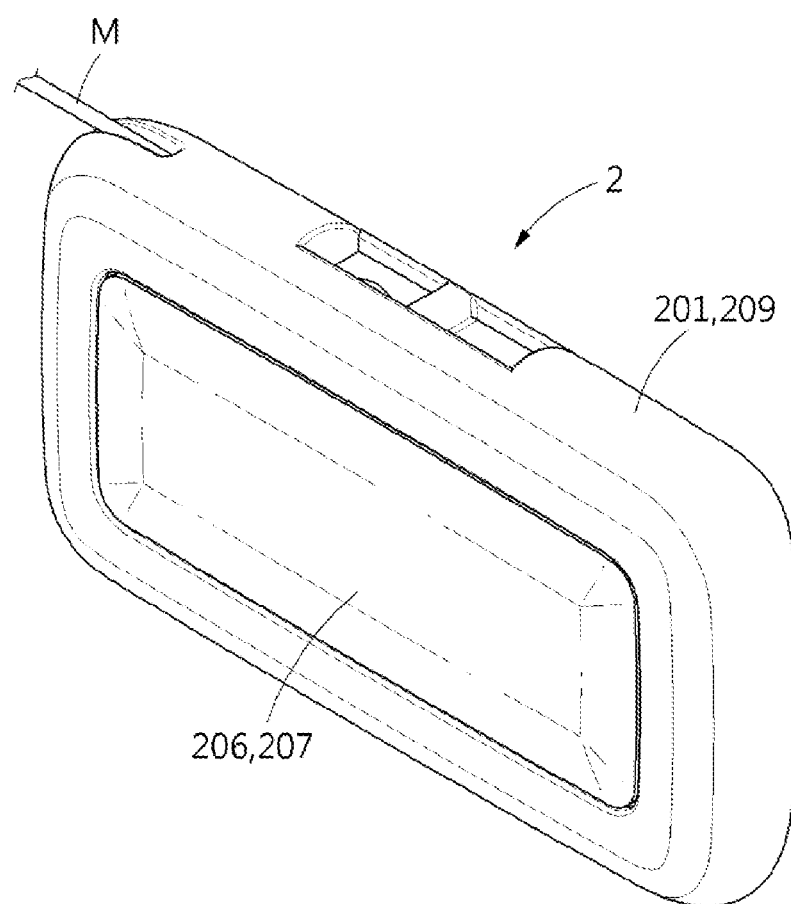
FIG. 9 is a rear perspective view of a haptic device according to an embodiment.
Figure 11:
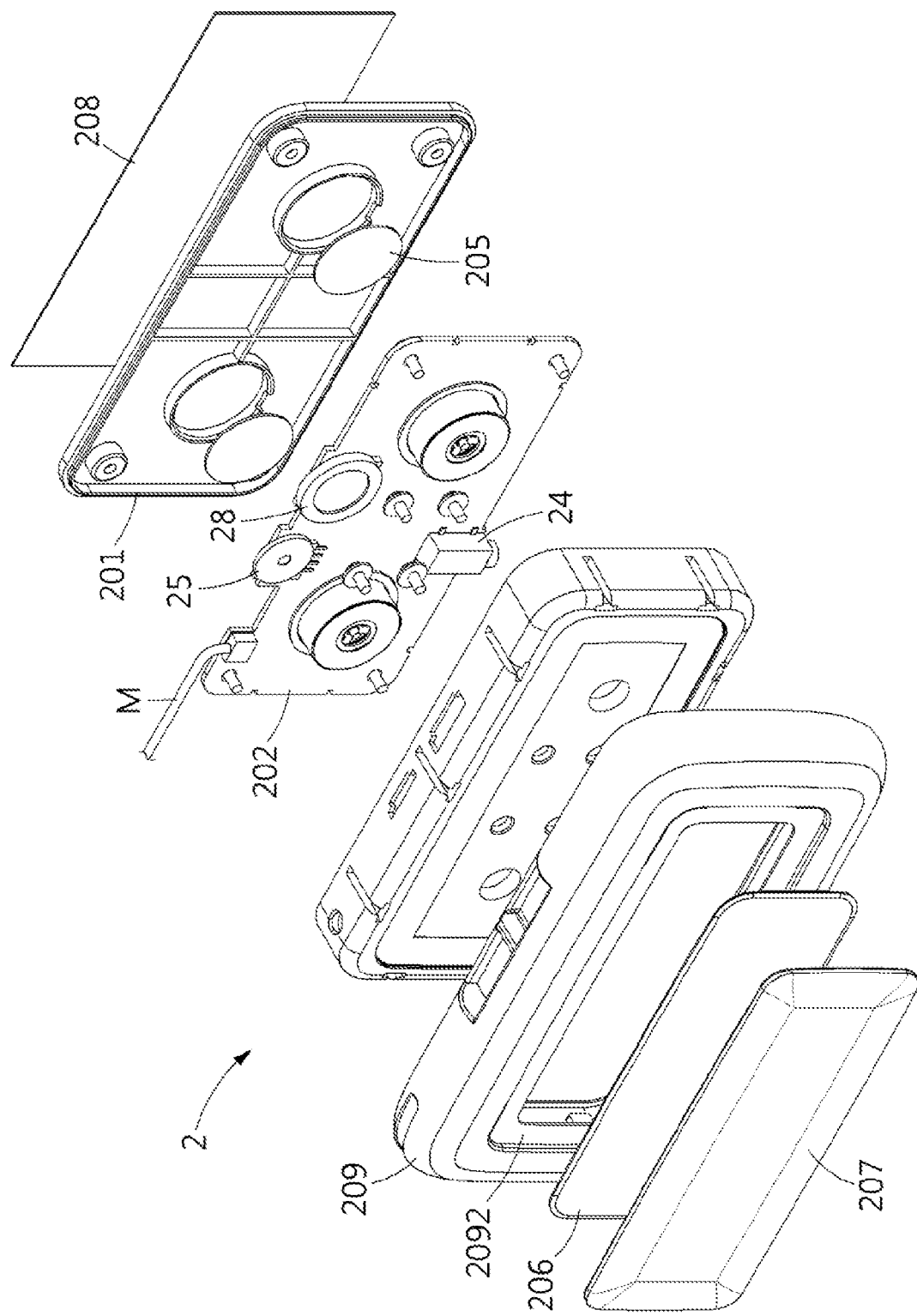
FIG. 11 is an exploded rear perspective view of a haptic device according to an embodiment.

FIG. 8 is a front perspective view of the haptic device 2 according to an embodiment, FIG. 9 is a rear perspective view of the haptic device 2 according to an embodiment, FIG. 10 is an exploded front perspective view of the haptic device 2 according to an embodiment, and FIG. 11 is an exploded rear perspective view of the haptic device 2 according to an embodiment.

Referring to FIGS. 8 to 11, the haptic device 2 may include a main body 201 and 209, a sub-body 206 and 207, the haptic actuator 1, a printed circuit board (PCB) 202, the DAC 21 (see FIG. 3), the sound volume controller 25, the haptic intensity controller 28, an adhesive pad 208, and the medium M.

The main body 201 and 209 may accommodate the haptic actuator 1. The main body 201 and 209 may include a case 201 and a bumper 209.

A surface of a housing 11 (see FIG. 12) of the haptic actuator 1 may be fixed to an inner wall of the case 201. For example, the case 201 may be made of a rigid material such as plastic.

The bumper 209 may surround at least a portion of the case 201. For example, the bumper 209 may be made of a more flexible material than the case 201 to protect components inside the case 201 from external impact. For example, the bumper 209 may have a shape surrounding an edge of the case 201 and exposing both surfaces of the case 201. Meanwhile, unlike this, it should be noted that the bumper 209 and the case 201 may be made of the same material or be integrated with each other.

The sub-body 206 and 207 may serve to directly provide haptic feedback to a user. The sub-body 206 and 207 may be located on a side of the case 201 and be mounted to be movable relative to the case 201. According to the above-described structure, because haptic feedback may be directly provided, more delicate and more efficient haptic feedback may be provided to the user compared to an indirect method for providing haptic effects for vibrating the entirety of an external case based on motion of a vibrator included therein. The sub-body 206 and 207 may include a transmitter 206 and a flexible cover 207.

The transmitter 206 may include a plate 2061, a fixed boss 2062 mounted on the plate 2061 and fixed to the haptic actuator 1, and a guide boss 2063 mounted on the plate 2061 to prevent detachment of the transmitter 206 from the case 201.

The flexible cover 207 may be made of a more flexible material than the transmitter 206 and be located on an opposite side of the plate 2061 from the fixed boss 2062. According to the flexible cover 207, tactile perception of the user may be increased.

The haptic actuator 1 may include a housing 11 (see FIG. 12) having an internal space, and a vehicle 12 (see FIG. 12) movable relative to the housing 11. Herein, the housing 11 may be fixed to the case 201, and the vehicle 12 may be fixed to the transmitter 206. According to the above-described structure, the sub-body 206 and 207 may move relative to the main body 201 and 209 due to operation of the haptic actuator 1. Meanwhile, a cushion 205 may be placed outside the housing 11 to attenuate friction sound generated by the housing 11. For example, the cushion 205 may be located between the housing 11 and an inner wall of the main body 201 and 209.

Meanwhile, the haptic device 2 may include a plurality of haptic actuators 1. For example, the plurality of haptic actuators 1 may include a left haptic actuator 1 and a right haptic actuator 1 respectively located on left and right sides of a virtual centerline passing through the haptic device 2.

The adhesive pad 208 may be located on one of the both surfaces of the case 201 where the transmitter 206 is not located, and include an adhesive surface attachable to the portable terminal P. The adhesive pad 208 may use, for example, a silicon gel pad which is semi-permanently usable after washed.

The PCB 202 may be placed in the case 201. Various electronic components such as the medium M, the DAC 21 (see FIG. 3), the sound volume controller 25, and/or the haptic intensity controller 28 may be mounted on the PCB 202. The case 201 and the PCB 202 may be stably fixed to each other by using fasteners 203.

For example, the PCB 202 may be placed to be spaced apart from both inner walls of the case 201. For example, support protrusions for supporting both surfaces of the PCB 202 may protrude from the both inner walls of the case 201. Using the above-described structure, a problem that an internal space of the case 201 serves as a large sound box may be prevented. In other words, a problem that vibration of the haptic actuator 1 vibrates the air in the internal space of the case 201 to cause noise leaking to the outside may be prevented. To provide the above-described structure, for example, a hole may be provided in the PCB 202 and the haptic actuator 1 may be inserted into the hole.

The sound volume controller 25 and/or the haptic intensity controller 28 may be provided, for example, in a dial shape.

The medium M may use, for example, a USB OTG cable as illustrated in FIG. 8. For example, a cable of the medium M may be inserted into a groove provided along an edge of the bumper 209, and a terminal of the medium M may be inserted into a recess A at a corner of the bumper 209, thereby increasing portability of the haptic device 2.

Figure 12:
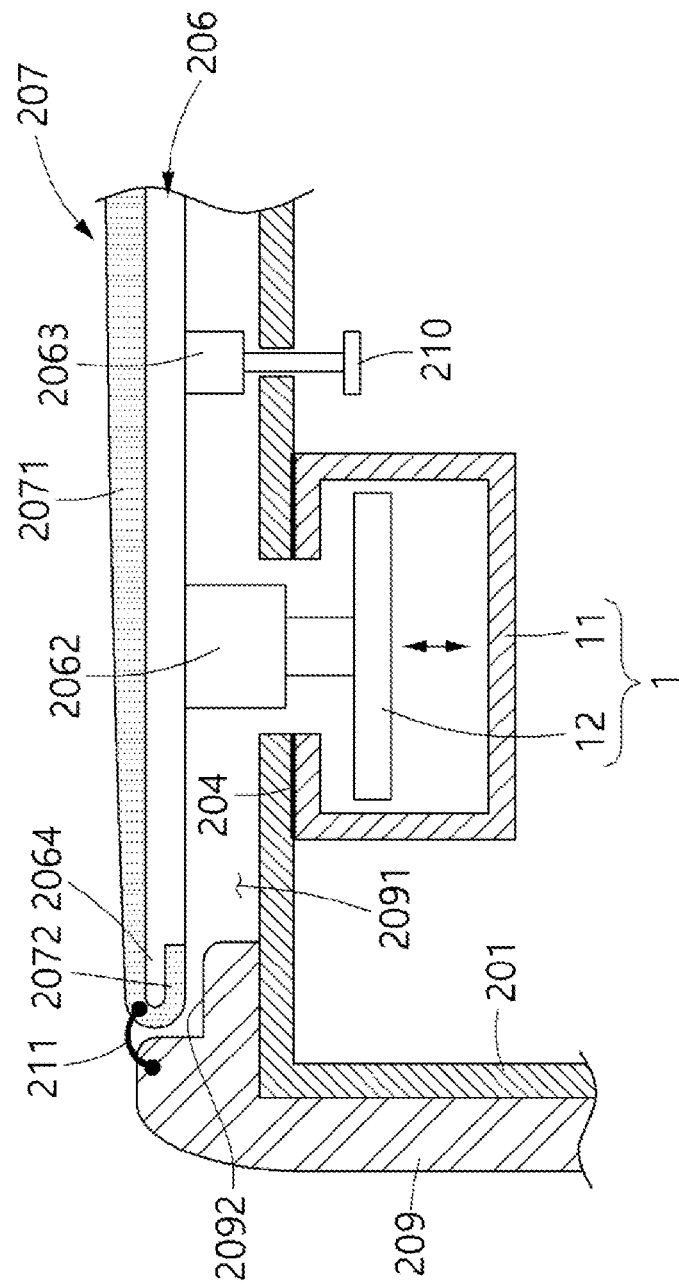
FIG. 12 is a cross-sectional view of a portion of a haptic device according to an embodiment.

FIG. 12 is a cross-sectional view of a portion of the haptic device 2 according to an embodiment.

Referring to FIG. 12, a surface of the housing 11 of the haptic actuator 1 may be fixed to an inner wall of a surface of the case 201 by using an adhesive 204. Herein, it should be noted that the adhesive 204 may use various known means in the form of, for example, tape and a liquid.

The housing 11 may be fixed to an inner wall of one of both surfaces of the case 201 close to the transmitter 206.

According to the above-described structure, transfer of vibration of the haptic actuator 1 to the portable terminal P located on the opposite surface of the case 201 may be reduced, and the efficiency of haptic feedback provided to a user through the sub-body 206 and 207 may be increased.

The vehicle 12 and a guide rod 210 may be respectively fixed to the fixed boss 2062 and the guide boss 2063 of the transmitter 206, and thus stable motion of the sub-body 206 and 207 may be ensured.

The vehicle 12 may include a protrusion protruding toward the fixed boss 2062 of the transmitter 206, and the protrusion may be fixed to the fixed boss 2062.

The guide rod 210 may include an end fixed to the guide boss 2063, and another end passing through a through hole provided in the case 201. The other end of the guide rod 210 may have a larger diameter than the through hole to prevent detachment of the transmitter 206 from the case 201 by more than a certain distance.

The bumper 209 may include an opening 2091 having a smaller area than the sub-body 206 and 207, and a stopper 2092 having a step shape recessed inward along an edge of the opening 2091.

The stopper 2092 may prevent insertion of the sub-body 206 and 207 into the main body 201 and 209 by more than a certain distance. According to the stopper 2092, the main body 201 and 209 may accommodate at least a portion of the sub-body 206 and 207 but direct contact between the sub-body 206 and 207 and the case 201 made of a rigid material may be prevented.

The flexible cover 207 may include a contact pad 2071 surrounding a front surface of the plate 2061, and a wing 2072 connected to an edge of the contact pad 2071.

The wing 2072 may prevent direct contact between the transmitter 206 and the main body 201 and 209. For example, the transmitter 206 may include a flange 2064 having a smaller thickness than the plate 2061 and extending outward from an edge of the plate 2061. In this case, the wing 2072 may have a shape bent inward to surround the flange 2064, and thus direct contact between the main body 201 and 209 and the transmitter 206 made of a rigid material may be prevented.

Meanwhile, the haptic device 2 may further include a seal 211 placed along an edge of the flexible cover 207 to connect the flexible cover 207 to the bumper 209. The seal 211 may be made of a flexible material to allow motion of the sub-body 206 and 207 relative to the main body 201 and 209 and prevent insertion of foreign substances into a space between the sub-body 206 and 207 and the main body 201 and 209.

Figure 13:
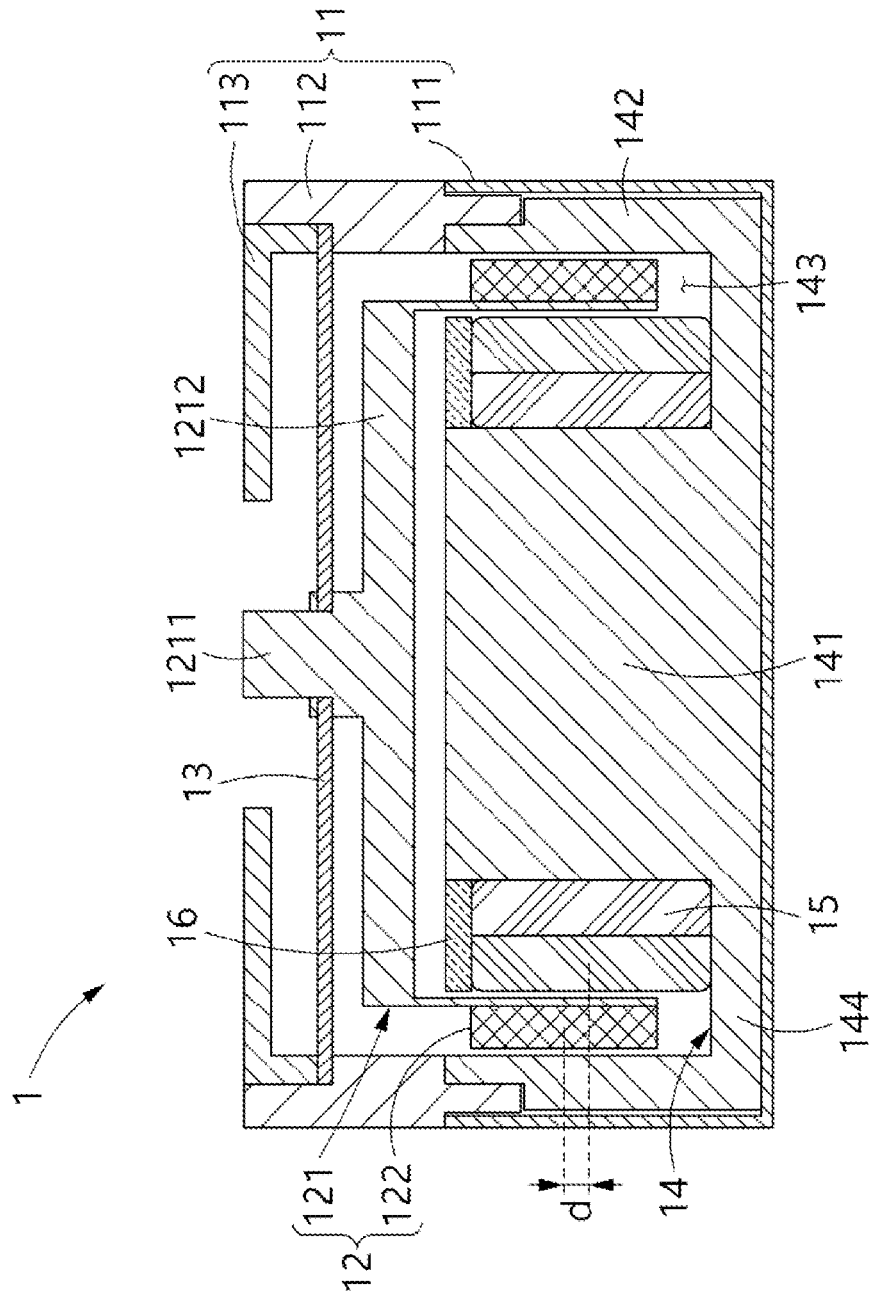
FIG. 13 is a cross-sectional view of a haptic actuator according to an embodiment.
Figure 14:
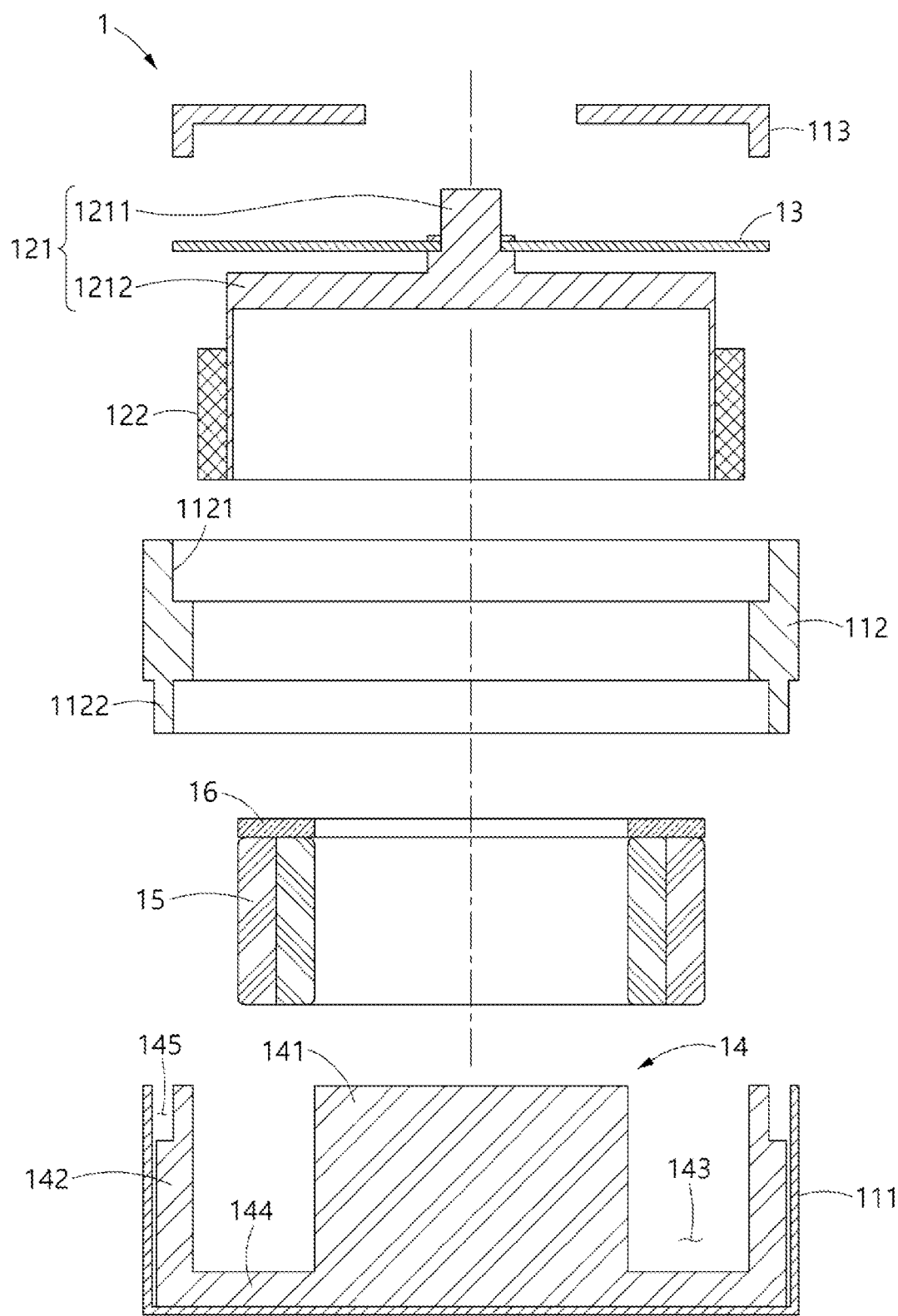
FIG. 14 is an exploded cross-sectional view of a haptic actuator according to an embodiment.
Figure 15:
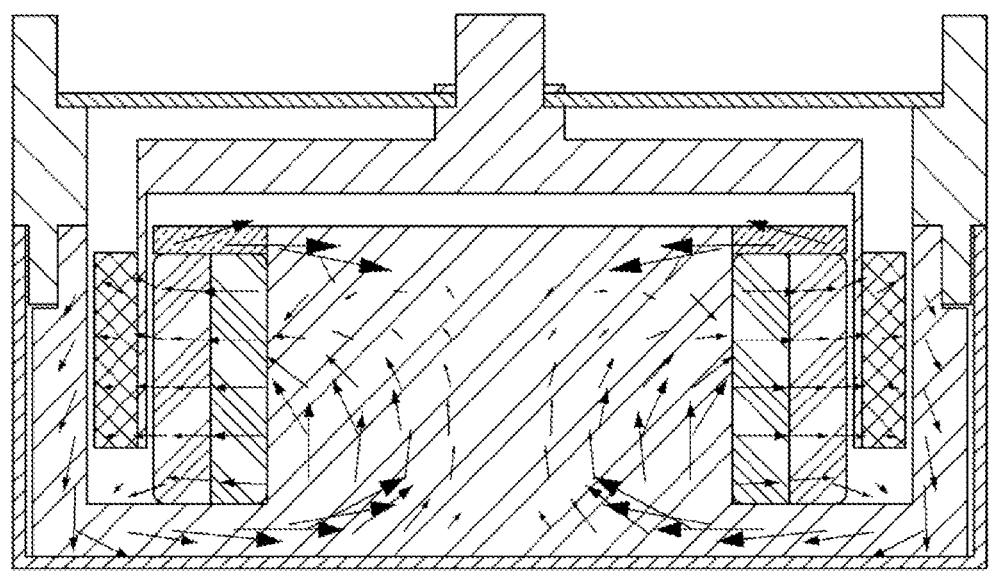
FIG. 15 is a cross-sectional view showing a magnitude and direction of magnetic force produced by a haptic actuator according to an embodiment.
Figure 16:
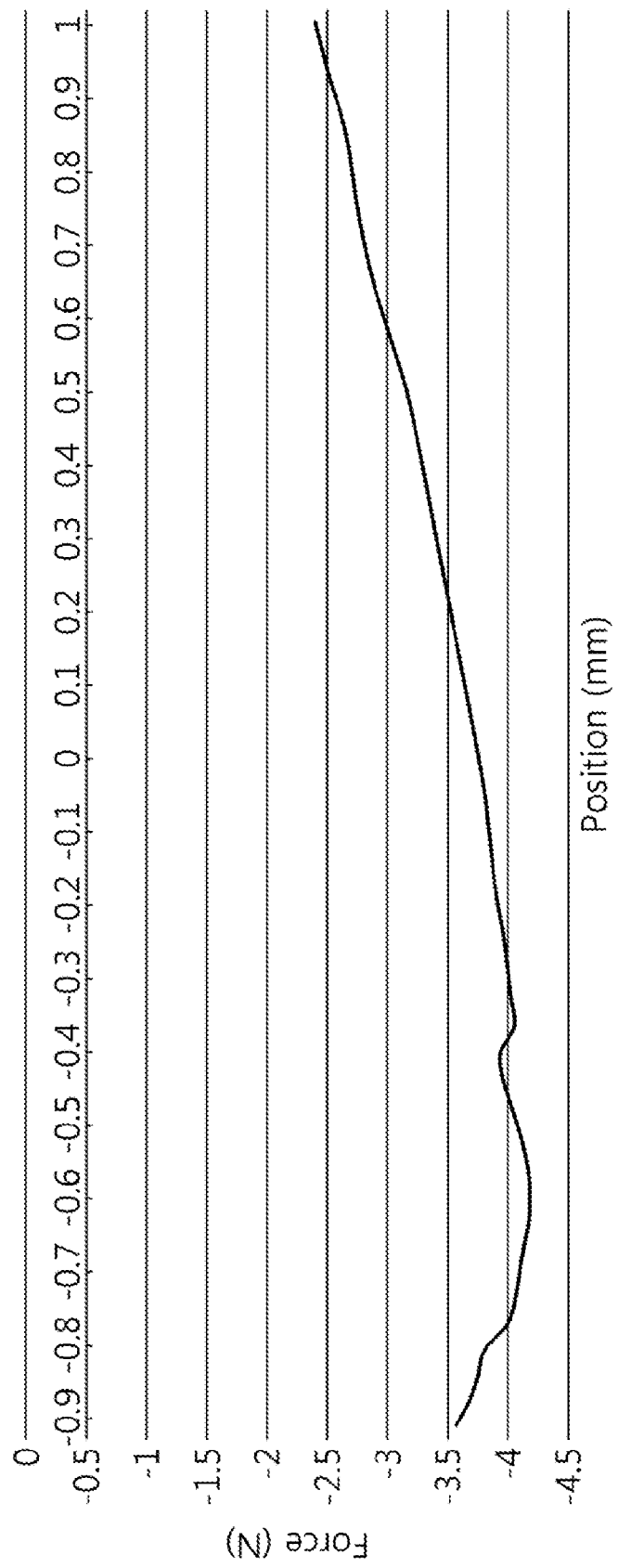
FIG. 16 is a graph showing vibration force produced due to displacement of a vehicle according to an embodiment.
Figure 17:
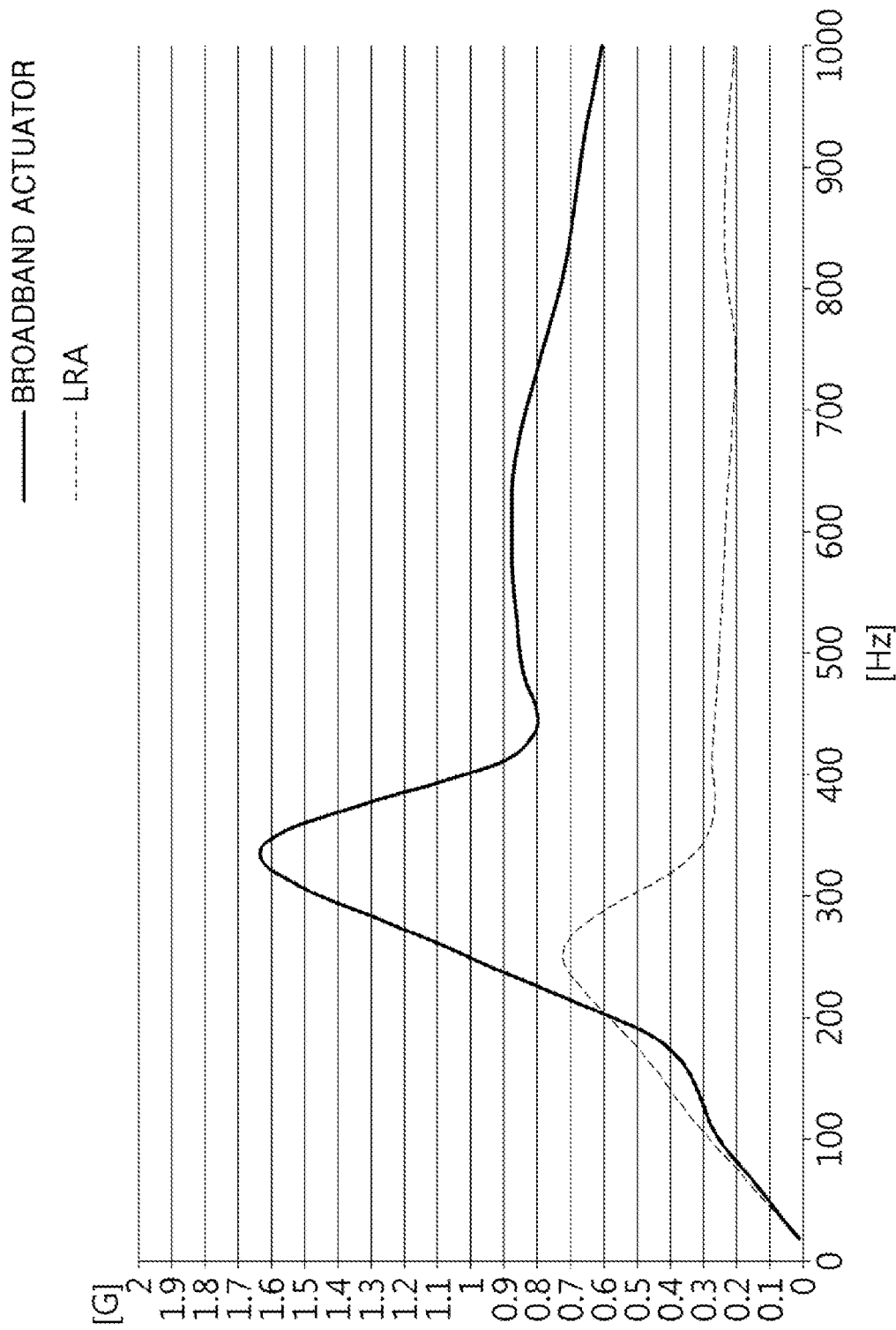
FIG. 17 is a graph showing vibration force produced per driving frequency by a general linear resonant actuator and a haptic actuator according to an embodiment.

FIG. 13 is a cross-sectional view of the haptic actuator 1 according to an embodiment, FIG. 14 is an exploded cross-sectional view of the haptic actuator 1 according to an embodiment, FIG. 15 is a cross-sectional view showing a magnitude and direction of magnetic force produced by the haptic actuator 1 according to an embodiment, FIG. 16 is a graph showing vibration force produced due to displacement of the vehicle 12 according to an embodiment, and FIG. 17 is a graph showing vibration force produced per driving frequency by a general linear resonant actuator and the haptic actuator 1 according to an embodiment.

Referring to FIGS. 13 to 17, the haptic actuator 1 may provide various haptic effects in a broadband from an ultra-low frequency band lower than 20 Hz to a high frequency band higher than 500 Hz or 1 KHz. Considering the above-described performance, the haptic actuator 1 may also be called a broadband haptic actuator. For example, the haptic actuator 1 may include the housing 11, a yoke 14, a radial magnet 15, the vehicle 12, and an elastic member 13.

The housing 11 may be a container having an internal space. For example, the internal space of the housing 11 may have a cylindrical shape. For example, the housing 11 may include a lower housing 111, a guide housing 112, and an upper housing 113.

The lower housing 111 may surround the yoke 14. For example, the lower housing 111 may have a cylindrical shape with an open top, and the yoke 14 may be inserted thereinto from above.

The guide housing 112 may be a hollow member connected downward to the lower housing 111 and the yoke 14 which are coupled to each other, and protruding upward. For example, a lower end 1122 of the guide housing 112 may have a structure that fits into a groove provided in an upper portion of an interface between the lower housing 111 and the yoke 14, and thus be fitted into the groove. For example, the guide housing 112 may include a step 1121 recessed into an upper portion of an inner circumferential surface thereof.

The upper housing 113 may be connected to the upper portion of the guide housing 112. The upper housing 113 may be a hollow member fitted to an inner circumferential surface of the step 1121. For example, the upper housing 113 may have a top opening. For example, the upper housing 113 may be mounted in the step 1121 after an edge of the elastic member 13 is placed on a lower portion of the step 1121 and, in this case, the upper housing 113 may press and fix the edge of the elastic member 13 from above.

The yoke 14 may be mounted in a lower portion of the internal space of the housing 11 to induce the flow of a magnetic field. For example, the yoke 14 may distribute lines of magnetic force generated from the radial magnet 15, to be concentrated on a coil 122 accommodated in the yoke 14. For example, the yoke 14 may include a lower yoke 144 mounted in a lower portion of the lower housing 111, an inner yoke 141 protruding upward from the lower portion of the lower housing 111, and an outer yoke 142 mounted along an inner circumferential surface of the lower housing 111.

The inner yoke 141 may be a cylindrical member protruding upward from a lower central portion of the internal space. For example, a centerline of the cylindrical inner yoke 141 may be located on the same line as the centerline of the cylindrical internal space.

The outer yoke 142 may be mounted to surround the inner circumferential surface of the lower housing 111. According to the above-described structure, a ring-shaped accommodation space 143 may be formed between the outer yoke 142 and the inner yoke 141, and the radial magnet 15, a pole piece 16, and the coil 122 may be accommodated in the accommodation space 143. For example, an upper portion of an outer circumferential surface of the outer yoke 142 may be recessed to form a step, and the step may form, together with an upper portion of the lower housing 111, a mount groove 145 to be coupled to the above-described lower end 1122 of the guide housing 112.

According to the yoke 14 and the pole piece 16, as illustrated in FIG. 15, the flow of magnetic force generated from the radial magnet 15 may not leak out from the yoke 14 and be induced to be concentrated on the accommodation space 143 where the coil 122 is located, and thus a high and uniform magnetic force may be applied along the entirety of the coil 122.

The radial magnet 15 may be a hollow magnet mounted to surround an outer circumferential surface of the inner yoke 141. For example, the radial magnet 15 may be mounted in a radial direction. In other words, polarity of an inner portion of the radial magnet close to a central axis thereof may be opposite to the polarity of an outer portion of the radial magnet 15 away from the central axis. For example, a length of the radial magnet 15 measured along a vibration direction of the vehicle 12 may be greater than a distance between an outer inner circumferential surface and an inner circumferential surface of the radial magnet 15.

The pole piece 16 may be mounted to cover a top surface of the radial magnet 15, and induce magnetic force to prevent the magnetic force of the radial magnet 15 from leaking upward. For example, a top surface of the pole piece 16 may be located on the same plane as the top surface of the inner yoke 141. According to the above-described structure, a soft magnetic path may be formed and a total volume of the haptic actuator 1 may be reduced compared to a movement distance of the vehicle 12. For example, a cushion or damper for reducing impact due to collision with the vehicle 12 may be mounted on at least one of both surfaces of the pole piece 16.

The vehicle 12 may be mounted in the internal space of the housing 11 to vertically move due to magnetic force flowing in the accommodation space 143. For example, the vehicle 12 may include a cylindrical mass 121 mounted to surround the radial magnet 15 and the inner yoke 141, and the coil 122 mounted along a circumference of the mass 121.

The mass 121 may include a cylindrical insert 1212 having a recess facing downward to accommodate the radial magnet 15 and the inner yoke 141, and a protrusion 1211 protruding upward from the insert 1212. For example, the mass 121 may be made of a lightweight material such as brass for operation in a haptic frequency band. For example, the mass 121 may be made of a less dense material than the yoke 14. For example, the mass 121 may vertically move along a direction in which the inner yoke 141 protrudes.

The insert 1212 may include a circular recess dented from below, and a lower edge thereof may be inserted into the accommodation space 143. In other words, at least portions of the radial magnet 15 and the inner yoke 141 may be inserted into the recess of the insert 1212.

The protrusion 1211 may protrude upward from a top surface of the insert 1212. For example, the protrusion 1211 may protrude upward from a center of the circular insert 1212. For example, a top surface of the protrusion 1211 may be exposed upward from the housing 11. For example, when no current is applied to the coil 122, the top surface of the protrusion 1211 may be located on the same plane as the top surface of the upper housing 113.

The coil 122 may be mounted along a circumference of the insert 1212. The coil 122 may receive a current in the form of an analog signal converted by the DAC 21 (see FIG. 3), to form a magnetic field, polarities of which are alternately changed along a vertical direction.

The elastic member 13 may elastically support the vehicle 12 from a side of the internal space. For example, the elastic member 13 may be made of an elastic material having a flat panel shape for connecting the inner circumferential surface of the housing 11 to the mass 121 along a plane direction perpendicular to a vertical direction. For example, the elastic member 13 may connect the upper housing 113 to the protrusion 1211. In this case, an end, i.e., the edge, of the elastic member 13 may be fitted, inserted, and fixed to the inner circumferential surface of the step 1121. For example, a top surface of the edge of the elastic member 13 in the step 1121 may be connected to a lower end of the upper housing 113 and, consequently, the edge of the elastic member 13 may be fixed to the upper housing 113.

Meanwhile, another end of the elastic member 13 horizontally extending from the end of the elastic member 13 fixed to the upper housing 113 may be in contact with and be fixed to an outer circumferential surface of the protrusion 1211.

According to the elastic member 13, the vehicle 12 may be elastically supported while being spaced apart from other elements except for an inner wall of the housing 11 and the elastic member 13. For example, the elastic member 13 may have a sufficiently high elastic modulus in such a manner that a side portion of the coil 122 is maintained in a state fully inserted into the accommodation space 143 even when the vehicle 12 moves upward by the largest displacement.

Meanwhile, in an initial state when no electricity is applied to the coil 122, a center of the coil 122 may be located higher than the center of the radial magnet 15. In addition, a top of the coil 122 may be located lower than the top of the pole piece 16. According to the above-described structure, in preparation for the amplitude of an applied current, vibration force of the vehicle 12 may be sufficiently provided, a downward movement distance of the vehicle 12 may be ensured, and the whole haptic actuator 1 may be provided in a compact size.

FIG. 16 shows a force N applied to the coil 122 depending on an upward driving distance (mm) of the vehicle 12 in an initial state when no current is applied to the coil 122. According to the graph of FIG. 16, it is shown that the force N applied to the coil 122 is the largest when the upward driving distance is about 0.5 mm to 0.7 mm (i.e., about −0.5 mm to −0.7 mm in FIG. 16) in the initial state.

Therefore, in the initial state, the largest upward displacement of the vehicle 12 may be 0.5 mm to 0.7 mm. In this case, a vertical driving distance of the vehicle 12 may also be 0.5 mm to 0.7 mm.

When no current is applied to the coil 122, a centerpoint of the coil 122 in a vertical direction may be located higher than the centerpoint of the radial magnet 15 by a predetermined distanced.

According to the structure in which the coil 122 is biased upward from the radial magnet 15, large magnetic force may be easily generated to move the coil 122, polarities of which are changed in a vertical direction when a current is initially applied, in an upward or downward direction and thus a response speed may be effectively increased.

When an alternating current is applied to the coil 122, the vehicle 12 may linearly move in a vertical direction while being connected to the elastic member 13, and a magnetic flux direction of the radial magnet 15 may be perpendicular to a motion direction of the vehicle 12.

FIG. 17 shows that, in a wide frequency band between 100 Hz and 1 kHz, the haptic actuator 1 may generate a vibration force equal to or higher than 0.2 G at which humans may generally perceive touch.

Figure 18:
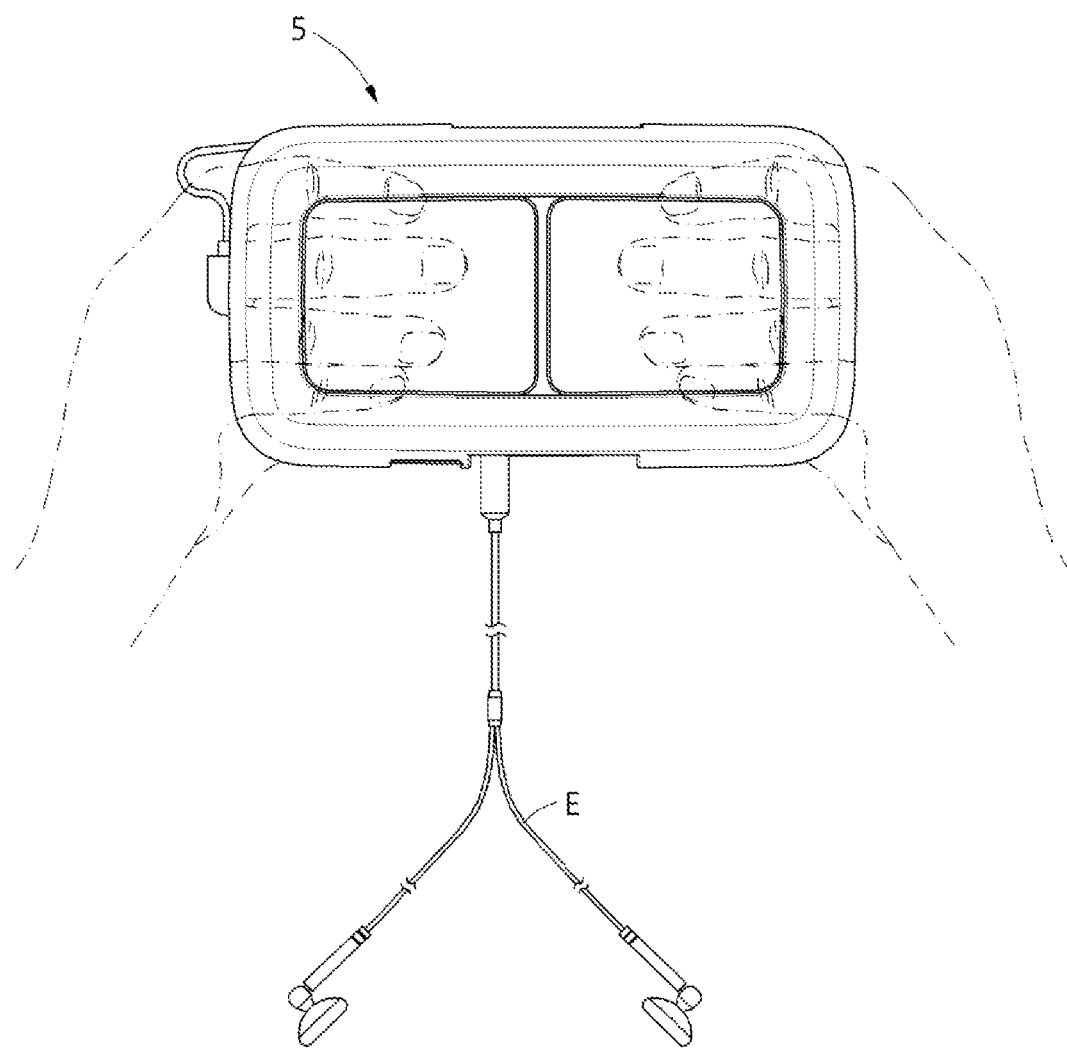
FIGS. 18 and 19 are rear views showing used states of haptic devices according to embodiments.
Figure 19:
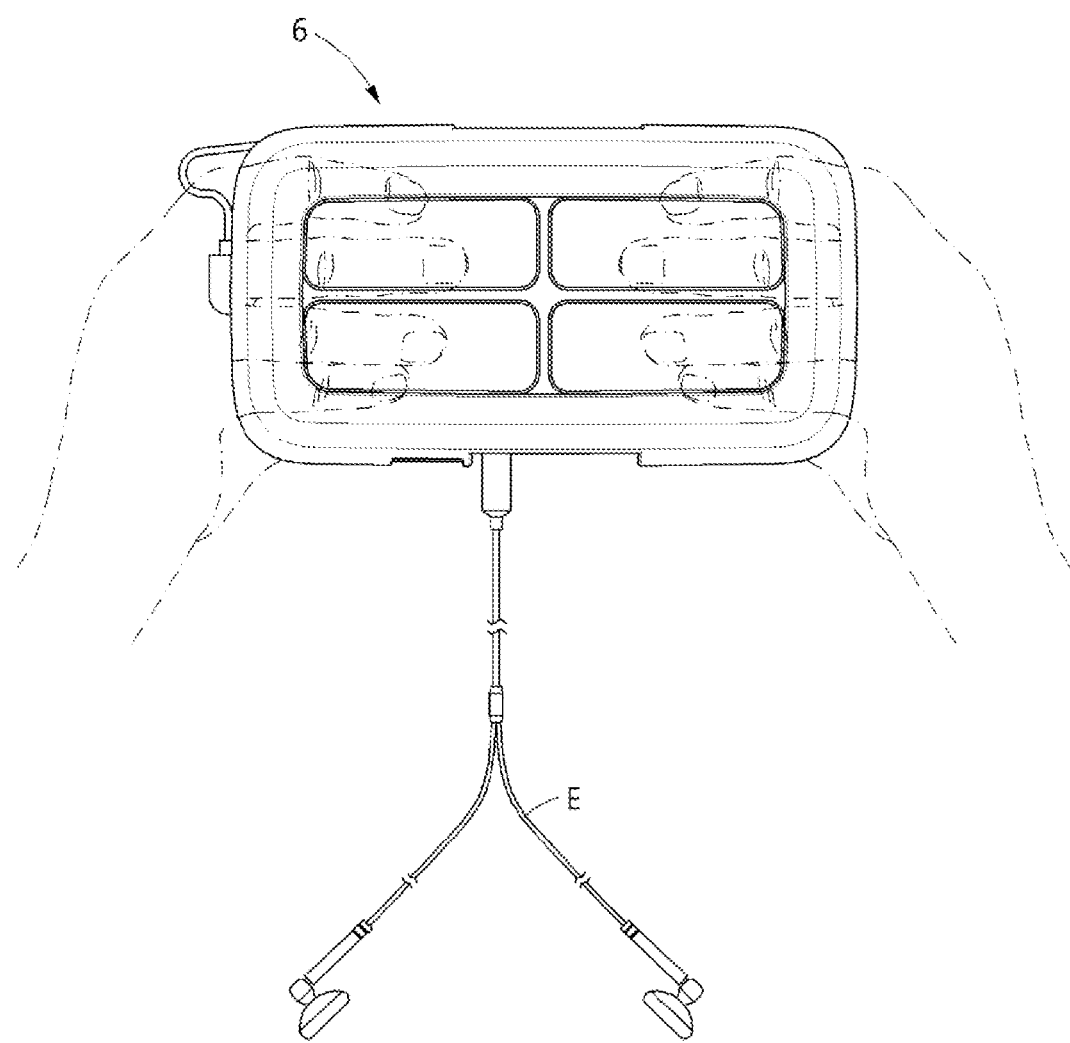

FIGS. 18 and 19 are rear views showing used states of haptic devices 5 and 6 according to embodiments.

Referring to FIGS. 18 and 19, the haptic devices 5 and 6 may include a plurality of separate transmitters. For example, a sub-body of the haptic devices 5 and 6 may include a left transmitter connected to the left haptic actuator 1L (see FIG. 4), and a right transmitter connected to the right haptic actuator 1R (see FIG. 4). For example, the right transmitter may be spaced apart from the left transmitter in such a manner that the left and right transmitters may move independently of each other. According to the above-described structure, the haptic devices 5 and 6 may provide more delicate haptic feedback to a user in a stereo manner.

The method according to embodiments may be implemented in the form of program instructions executable by various computer means and be recorded on a computer-readable recording medium. The computer-readable recording medium may include program instructions, data files, data structures, or a combination thereof. The program instructions recorded on the medium may be those specially designed and configured for the embodiments, or those known to and usable by one of ordinary skill in the art of computer software. Examples of the computer-readable recording medium include magnetic media (e.g., hard disks, floppy disks, and magnetic tape), optical media (e.g., CD-ROMs and DVDs), magneto-optical media (e.g., floptical disks), and hardware devices (e.g., ROMs, RAMs, and flash memories) that are specially configured to store and execute program instructions. Examples of the program instructions include both machine code, such as produced by a compiler, and high-level language code that may be executed by the computer using an interpreter. The above-mentioned hardware devices may be configured to serve as one or more software modules to perform operations of the embodiments, or vice versa.

While the present invention has been particularly shown and described with reference to embodiments thereof, it will be understood by one of ordinary skill in the art that various changes in form and details may be made therein. For example, appropriate results may also be achieved when the described operations are performed in a different order and/or when the described elements of the structure or apparatus are connected or combined in a different manner and/or are replaced or substituted by other elements or equivalents thereof.

What is claimed is:

1. A haptic device comprising:
    a haptic actuator;
    a main body in which the haptic actuator is disposed; and
    a sub-body being connected to the haptic actuator to be movable relative to the main body by operation of the haptic actuator,
    wherein the haptic actuator comprises:
    a housing having an internal space; and
    a vehicle movable relative to the housing,
    wherein the housing is fixed to the main body,
    wherein the vehicle includes a protrusion being connected to the sub-body, and
    wherein the haptic device further comprises a cushion placed to surround at least a portion of the housing to attenuate friction sound generated by the housing.

2. The haptic device of claim 1, further comprising:
    a medium configured to receiving a digital sound signal from a portable terminal; and
    a digital-to-analog converter (DAC) configured to receiving the digital sound signal from the medium and convert the digital sound signal into an analog signal,
    wherein the haptic actuator driven by receiving the analog signal.

3. The haptic device of claim 2, further comprising an adhesive pad located on another side of the main body and comprising an adhesive surface attachable to the portable terminal.

4. The haptic device of claim 2, further comprising a printed circuit board (PCB) placed in the main body and having the medium and the DAC mounted thereon,
    wherein the haptic actuator is inserted into a hole provided in the PCB.

5. The haptic device of claim 2, wherein the haptic actuator comprises:

a left haptic actuator located on a left side of a virtual centerline passing through the haptic device; and a right haptic actuator located on a right side of the virtual centerline passing through the haptic device.

6. The haptic device of claim 5, wherein the analog signal converted by the DAC is a stereo analog signal comprising a plurality of signals, and wherein, in the stereo analog signal, a first signal is input to the left haptic actuator and a second signal different from the first signal is input to the right haptic actuator.

7. The haptic device of claim 6, wherein the sub-body comprises:

a left transmitter connected to the left haptic actuator; and a right transmitter connected to the right haptic actuator and spaced apart from the left transmitter to move independently of the left transmitter.

8. The haptic device of claim 1, wherein the sub-body located on a side of the main body and spaced from the main body, the sub-body being connected to the haptic actuator to be movable relative to the main body by operation of the haptic actuator.

9. The haptic device of claim 1, further comprising a seal made of a flexible material to prevent insertion of foreign substances into a space between the main body and the sub-body.

10. The haptic device of claim 1, wherein a surface of the housing is fixed to an inner wall of a surface of the main body.

11. The haptic device of claim 1, further comprising a guide rod having an end fixed to the sub-body and another end passing through a through hole in the main body, and mounted to guide motion of the sub-body relative to the main body.

12. The haptic device of claim 11, wherein the another end of the guide rod has a larger diameter than the through hole to prevent detachment of the sub-body from the main body by more than a certain distance.

13. The haptic device of claim 1, wherein the main body comprises a stopper to prevent insertion of the sub-body into the main body by more than a certain distance.

14. The haptic device of claim 1, wherein the main body comprises:

a case having an inner wall to which a surface of the housing is fixed; and a bumper made of a more flexible material than the case and surrounding at least a portion of the case.

15. The haptic device of claim 14, wherein the bumper comprises:

an opening having a smaller area than the sub-body; and a stopper having a step shape recessed inward along an edge of the opening, and capable of accommodating at least a portion of the sub-body and preventing direct contact between the sub-body and the case.

16. A haptic device comprising:

a haptic actuator;

a main body in which the haptic actuator is disposed; and a sub-body being connected to the haptic actuator to be movable relative to the main body by operation of the haptic actuator, wherein the haptic actuator comprises:

a housing having an internal space; and a vehicle movable relative to the housing, wherein the housing is fixed to the main body, wherein the vehicle includes a protrusion being connected to the sub-body, wherein the sub-body comprises a fixed boss protruding toward the vehicle, and wherein the protrusion protrudes toward the sub-body and is fixed to the fixed boss.

17. The haptic device of claim 16, wherein the sub-body comprises:

a transmitter comprising the fixed boss, and a plate where the fixed boss is mounted; and a flexible cover made of a more flexible material than the transmitter and located on an opposite side of the plate from the fixed boss.

18. The haptic device of claim 17, wherein the flexible cover comprises a contact pad surrounding a front surface of the plate; and a wing connected to an edge of the contact pad to prevent direct contact between the transmitter and the main body.

19. The haptic device of claim 18, wherein:

the transmitter further comprises a flange having a smaller thickness than the plate and extending outward from an edge of the plate, and the wing has a shape bent inward to surround the flange.

* * * * *